US012691380B2

(12) United States Patent
Adjemian et al.

(10) Patent No.: US 12,691,380 B2
(45) Date of Patent: Jul. 28, 2026

(54) TRACKING AND REPRESENTING VIDEO GAME HELP SESSIONS

(71) Applicant: Microsoft Technology Licensing, LLC, Redmond, WA (US)

(72) Inventors: Monica Ann Adjemian, Los Angeles, CA (US); Jennifer R. Guriel, Kirkland, WA (US); Gershom Payzer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 18/797,999

(22) Filed: Aug. 8, 2024

(65) Prior Publication Data

US 2026/0042009 A1    Feb. 12, 2026

(51) Int. Cl.
*A63F 13/5375*    (2014.01)
*A63F 13/493*    (2014.01)
(Continued)

(52) U.S. Cl.
CPC ........ *A63F 13/5375* (2014.09); *A63F 13/493* (2014.09); *A63F 13/69* (2014.09);
(Continued)

(58) Field of Classification Search
CPC .... A63F 13/5375; A63F 13/493; A63F 13/69; A63F 13/79; A63F 13/86; A63F 13/87; A63F 2300/305; A63F 2300/5546; A63F 2300/556; A63F 2300/572; A63F 2300/577; A63F 2300/609; A63F 2300/636
See application file for complete search history.

(56) References Cited

U.S. PATENT DOCUMENTS 8,469,805 B2 *  6/2013  Kilgore ................... A63F 13/30
                                                                463/16
8,469,821 B2 *  6/2013  Van Luchene ........ G07F 17/323
                                                                463/42
(Continued)

FOREIGN PATENT DOCUMENTS

CN        112169327 A      1/2021
CN        113613743 A      11/2021
(Continued)

OTHER PUBLICATIONS

International Search Report and Written Opinion received for PCT Application No. PCT/US2025/030290, (MS# 057846-PCT01) mailed on Aug. 29, 2025, 17 pages.
(Continued)

*Primary Examiner* — William H Mcculloch, Jr.
(74) *Attorney, Agent, or Firm* — Rainier Patents, P.S.

(57)    ABSTRACT

The disclosed concepts relate to tracking and representing help sessions for video games where video game players are assisted by a helper, e.g., another video game player and/or a trained machine learning model. For instance, the disclosed implementations can graphically modify a controllable entity, such as a character or vehicle, to convey that the current video game player is being assisted by a helper. As another example, the disclosed implementations can graphically modify game achievements to indicate when a given achievement was earned with assistance from a helper.

20 Claims, 20 Drawing Sheets

(51) Int. Cl.

| | |
|---|---|
| *A63F 13/69* | (2014.01) |
| *A63F 13/79* | (2014.01) |
| *A63F 13/86* | (2014.01) |
| *A63F 13/87* | (2014.01) |

(52) U.S. Cl.
CPC .............. *A63F 13/79* (2014.09); *A63F 13/86* (2014.09); *A63F 13/87* (2014.09); *A63F 2300/305* (2013.01); *A63F 2300/5546* (2013.01); *A63F 2300/556* (2013.01); *A63F 2300/572* (2013.01); *A63F 2300/577* (2013.01); *A63F 2300/609* (2013.01); *A63F 2300/636* (2013.01)

(56) References Cited

U.S. PATENT DOCUMENTS

| | | | | |
|---|---|---|---|---|
| 9,274,780 | B1 | 3/2016 | Velummylum | |
| 9,873,050 | B2 | 1/2018 | Knutsson | |
| 9,914,054 | B2* | 3/2018 | Smith | A63F 13/537 |
| 10,427,047 | B2* | 10/2019 | Benedetto | A63F 13/215 |
| 10,449,461 | B1* | 10/2019 | Verma | A63F 13/424 |
| 10,576,380 | B1 | 3/2020 | Beltran | |
| 10,610,783 | B2* | 4/2020 | Benedetto | A63F 13/5375 |
| 10,821,358 | B2 | 11/2020 | Kunieda | |
| 10,874,947 | B2 | 12/2020 | Benedetto | |
| 10,933,331 | B2* | 3/2021 | Benedetto | A63F 13/85 |
| 11,154,784 | B2 | 10/2021 | Bortnik | |
| 11,278,807 | B2* | 3/2022 | Benedetto | A63F 13/35 |
| 11,344,804 | B2* | 5/2022 | Smith | A63F 13/35 |
| 11,420,123 | B2* | 8/2022 | Wiggeshoff | A63F 13/86 |
| 11,420,124 | B2 | 8/2022 | Krishnamurthy | |
| 11,471,760 | B2 | 10/2022 | Perry | |
| 11,504,618 | B2* | 11/2022 | Sherwani | A63F 13/79 |
| 11,590,428 | B2 | 2/2023 | Benedetto | |
| 11,857,883 | B2 | 1/2024 | Benedetto | |
| 11,918,916 | B2* | 3/2024 | Payzer | A63F 13/79 |
| 11,931,657 | B2* | 3/2024 | Summa | A63F 13/35 |
| 12,318,690 | B2* | 6/2025 | Schupp | A63F 13/69 |
| 2007/0173327 | A1* | 7/2007 | Kilgore | A63F 13/12 463/42 |
| 2012/0276992 | A1* | 11/2012 | Moinuddin | A63F 13/798 463/31 |
| 2012/0283014 | A1* | 11/2012 | Van Luchene | A63F 13/847 463/31 |
| 2013/0084985 | A1* | 4/2013 | Green | A63F 13/35 463/40 |
| 2013/0116022 | A1 | 5/2013 | Davison et al. | |
| 2014/0075305 | A1* | 3/2014 | Kaihu | G06Q 10/40 715/706 |
| 2014/0357352 | A1* | 12/2014 | Van Luchene | A63F 13/55 463/29 |
| 2015/0119147 | A1* | 4/2015 | Dolan | A63F 13/798 463/42 |
| 2017/0354888 | A1 | 12/2017 | Benedetto | |
| 2018/0001205 | A1 | 1/2018 | Osman et al. | |
| 2019/0209925 | A1* | 7/2019 | Benedetto | A63F 13/215 |
| 2019/0232169 | A1* | 8/2019 | Benedetto | A63F 13/422 |
| 2019/0291011 | A1 | 9/2019 | Benedetto | |
| 2019/0329139 | A1 | 10/2019 | Di Giacomo Toledo | |
| 2020/0206616 | A1 | 7/2020 | Perry | |
| 2020/0269136 | A1 | 8/2020 | Gurumurthy | |
| 2020/0289943 | A1 | 9/2020 | Rico | |
| 2020/0324206 | A1 | 10/2020 | Yilmazcoban | |
| 2020/0387550 | A1 | 12/2020 | Cappetta et al. | |
| 2021/0106918 | A1 | 4/2021 | Osman | |
| 2021/0113931 | A1* | 4/2021 | Benedetto | A63F 13/35 |
| 2021/0220732 | A1 | 7/2021 | Thomas | |
| 2021/0220746 | A1* | 7/2021 | Paracha | G06Q 10/101 |
| 2021/0339146 | A1* | 11/2021 | Rico | A63F 13/35 |
| 2022/0034665 | A1 | 2/2022 | Neubecker | |
| 2022/0203232 | A1* | 6/2022 | Wiggeshoff | A63F 13/87 |
| 2022/0219087 | A1 | 7/2022 | Beltran | |
| 2022/0245131 | A1 | 8/2022 | Loeb | |
| 2022/0274018 | A1 | 9/2022 | Gurumurthy | |
| 2022/0284884 | A1 | 9/2022 | Tongya | |
| 2023/0016824 | A1 | 1/2023 | Benedetto | |
| 2023/0024836 | A1* | 1/2023 | Bennett | G06N 20/00 |
| 2023/0211241 | A1* | 7/2023 | Summa | A63F 13/355 463/42 |
| 2023/0381652 | A1 | 11/2023 | Rudi | |
| 2023/0381661 | A1 | 11/2023 | Egeland | |
| 2024/0066413 | A1 | 2/2024 | Arimatsu | |
| 2024/0108979 | A1 | 4/2024 | Azmandian | |
| 2024/0303261 | A1 | 9/2024 | Denison | |
| 2024/0382856 | A1 | 11/2024 | Beltran | |
| 2025/0050214 | A1 | 2/2025 | Fisher | |
| 2025/0121279 | A1 | 4/2025 | Michailidis | |
| 2025/0121289 | A1 | 4/2025 | Tinklenberg | |
| 2025/0229187 | A1 | 7/2025 | Donovan | |
| 2025/0303292 | A1* | 10/2025 | Whitcomb | A63F 13/25 |
| 2026/0042004 | A1* | 2/2026 | Adjemian | A63F 13/355 |
| 2026/0042009 | A1* | 2/2026 | Adjemian | A63F 13/5375 |
| 2026/0042010 | A1* | 2/2026 | Adjemian | A63F 13/5375 |
| 2026/0042011 | A1* | 2/2026 | Adjemian | A63F 13/5375 |
| 2026/0042019 | A1* | 2/2026 | Adjemian | A63F 13/73 |
| 2026/0042021 | A1* | 2/2026 | Adjemian | A63F 13/5375 |

FOREIGN PATENT DOCUMENTS

| | | |
|---|---|---|
| IN | 202017045641 A | 10/2021 |
| JP | 7299231 B2 | 6/2023 |
| WO | 2023182876 A1 | 9/2023 |

OTHER PUBLICATIONS

International Search Report and Written Opinion received for PCT Application No. PCT/US2025/030484 (MS# 502019-PCT01), mailed on Aug. 29, 2025, 10 pages.

International Search Report and Written Opinion received for PCT Application No. PCT/US2025/030486 (MS# 502020-PCT01), mailed on Aug. 26, 2025, 15 Pages.

"Hosting and Permissions", accessed on link https://support.parsec. app/hc/en-us/articles/4422936497165-Hosting-and Permissions, Feb. 29, 2024, 5 pages.

"Rainway", accessed on link https://docs.rainway.com/docs/input, Jul. 6, 2022, 1 page.

"Steam Remote Play", accessed on link https://help.steampowered. com/en/faqs/view/0689-74B8-92AC-10F2, Publication Date Sep. 2021, retrieved on May 20, 2024, 6 pages.

Ellis, Megan, "How to Use Parsec to Play Local Co-Op Games Online", accessed on link https://www.makeuseof.com/tag/play-local-coop-games-online/, Jun. 8, 2020, 10 pages.

How to use Share Play on PS4 consoles, accessed on link https:// www.playstation.com/en-us/support/games/share-play-playstation/, 2024, 7 pages.

Radford, et al., "Improving Language Understanding by Generative Pre-Training," available at https://cdn.openai.com/research-covers/ language-unsupervised/language_understanding_paper.pdf, Jun. 11, 2018, 12 pages.

Sony, "PS Remote Play", accessed on link https://www.playstation. com/en-in/remote-play/, 2024, 14 pages.

He, et al., "Deep Residual Learning for Image Recognition," Proceedings of the IEEE Conference on Computer Vision and Pattern Recognition, 2016, pp. 770-778, 9 pages.

Rombach, et al., "High-Resolution Image Synthesis with Latent Diffusion Models," Proceedings of the IEEE/CVF Conference on Computer Vision and Pattern Recognition, 2022, pp. 10684-10695, 12 pages.

Zhang, et al., "Adding Conditional Control to Text-to-Image Diffusion Models," Proceedings of the IEEE/CVF International Conference on Computer Vision, 2023, pp. 3836-3847, 12 pages.

U.S. Appl. No. 18/797,960, filed Aug. 8, 2024.

U.S. Appl. No. 18/798,022, filed Aug. 8, 2024.

U.S. Appl. No. 18/798,063, filed Aug. 8, 2024.

U.S. Appl. No. 18/798,096, filed Aug. 8, 2024.

U.S. Appl. No. 18/798,139, filed Aug. 8, 2024.

(56) References Cited

OTHER PUBLICATIONS

Non-Final office Action mailed on Apr. 30, 2026, in U.S. Appl. No. 18/798,096, 12 pages.

Non-Final Office Action mailed on Jun. 3, 2026, in U.S. Appl. No. 18/797,960, 27 Pages.

Non-Final Office Action mailed on May 14, 2026, in U.S. Appl. No. 18/798, 139, 14 Pages.

Non-Final Office Action mailed on May 28, 2026, in U.S. Appl. No. 18/798,063, 20 pages.

* cited by examiner

LuckySeven: Watch how I make a sharp right turn immediately before the stairs

NewGuy42:    Ok thanks,  I will watch closely!

LuckySeven:  Ok here goes!

NewGuy42
(assisted by
LuckySeven)

622

624

626

620

616

NewGuy42
(assisted by
LuckySeven)

618

LuckySeven:    Not    yet
...almost there!

LuckySeven: Now hit the bottom button to slow down and turn right at the same time. Most people do not look here, they just head up the stairs!

NewGuy42
(assisted by LuckySeven)

LuckySeven

- Home
- My Games
- Cloud Games
- Game Store

Show Queue
Manage Recent Installations

View Profile

LuckySeven
Online
+ Link social accounts

*Hoverboard
Adventure —
Gemfinder Edition*

Play
Now!

670

Gamerscore
G 90/100 — 668

Achievements
32 (14 helper)

Time Played
22 hrs, 17 min

Helper Achievements ∨

By progress ∨

Helped 3 people
earn wings
— 664

Helped 7 people
find the hoverboard
— 666

Helped 1 person
find a rare gem
— 662

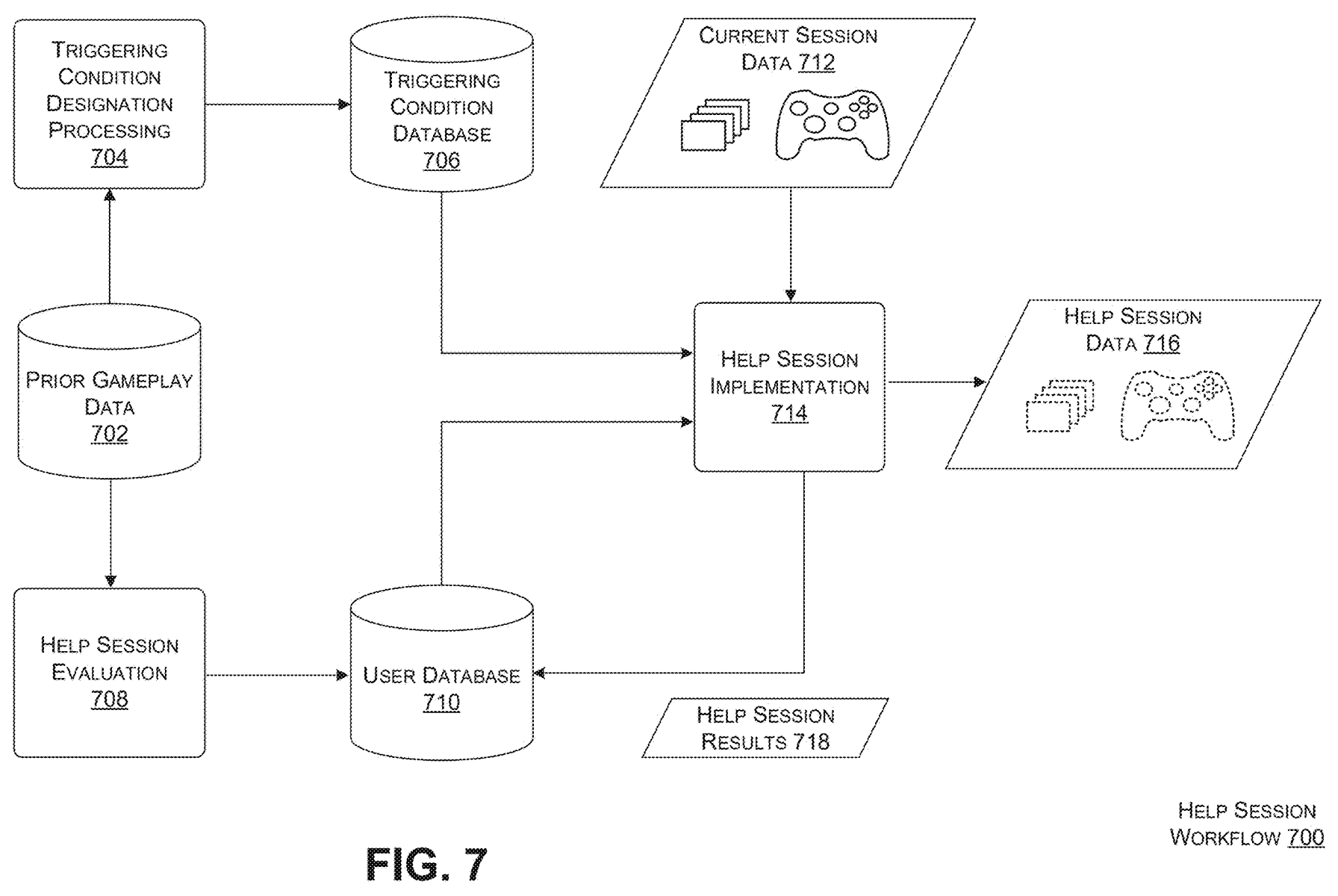

HELP SESSION DATA 716

CURRENT SESSION DATA 712

HELP SESSION IMPLEMENTATION 714

HELP SESSION RESULTS 718

TRIGGERING CONDITION DATABASE 706

USER DATABASE 710

TRIGGERING CONDITION DESIGNATION PROCESSING 704

PRIOR GAMEPLAY DATA 702

HELP SESSION EVALUATION 708

HELP SESSION WORKFLOW 700

FIG. 7

TRACKING AND REPRESENTING VIDEO GAME HELP SESSIONS

CROSS-REFERENCE TO RELATED APPLICATIONS

This application is related to, and incorporates by reference in their entirety, the following: US Patent Applications which were each filed concurrently with this application on Aug. 8, 2024: U.S. patent application Ser. No. 18/797,960, entitled "STATE MANAGEMENT FOR VIDEO GAME HELP SESSIONS;" U.S. patent application Ser. No. 18/798,022, entitled "DETECTING TRIGGERING CONDITIONS FOR VIDEO GAME HELP SESSIONS;" U.S. patent application Ser. No. 18/798,063, entitled "MACHINE LEARNING FOR VIDEO GAME HELP SESSIONS;" U.S. patent application Ser. No. 18/798,096, entitled "RESTRICTING VIDEO GAME HELP SESSIONS;" and U.S. patent application Ser. No. 18/798,139, entitled "AGE-SENSITIVE IMPLEMENTATION OF VIDEO GAME HELP SESSIONS."

BACKGROUND

Video game players often encounter difficult gaming situations, such as difficult enemies, difficult items to find, difficult levels to complete, etc. In some cases, video game players will seek the assistance of other video game players, e.g., by posting on online forums to get suggestions from other members of the video gaming community to overcome difficult parts of a given game. In other cases, video game players consult online videos of other players demonstrating how to overcome difficult gaming situations. However, these techniques are rather rudimentary.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to video game help sessions. One example entails a computer-implemented method or technique that can include obtaining a help session starting state from a saved state of game play of a particular video game by a particular video game player. The method or technique can also include initiating a help session for the particular video game player from the help session starting state, the help session involving a video game helper assisting the particular video game player with the particular video game. The method or technique can also include obtaining an updated help session state of the particular video game after the help session. The method or technique can also include in an instance when the particular video game player accepts the updated help session state and the updated help session state includes an achievement that occurred during the help session, updating a user database with a record indicating that the achievement occurred during the help session. The method or technique can also include outputting an indication that the particular video game player earned the achievement with assistance.

Another example entails a system that includes processing resources and storage resources. The storage resources can store computer-readable instructions which, when executed by the processing resources, cause the processing resources to obtain a help session starting state from a saved state of game play of a particular video game by a particular video game player. The computer-readable instructions can also cause the system to initiate a help session for the particular video game player from the help session starting state, the help session involving a video game helper assisting the particular video game player with the particular video game. The computer-readable instructions can also cause the system to obtain an updated help session state of the particular video game after the help session. The computer-readable instructions can also cause the system to in an instance when the particular video game player accepts the updated help session state and the updated help session state includes an achievement that occurred during the help session, update a user database with a record indicating that the achievement occurred during the help session. The computer-readable instructions can also cause the system to output an indication that the particular video game player earned the achievement with assistance.

Another example includes a computer-readable storage medium storing computer-readable instructions which, when executed by a hardware processing unit cause the hardware processing unit to perform acts. The acts can include obtaining a help session starting state from a saved state of game play of a particular video game by a particular video game player. The acts can also include initiating a help session for the particular video game player from the help session starting state, the help session involving a video game helper assisting the particular video game player with the particular video game. The acts can also include obtaining an updated help session state of the particular video game after the help session. The acts can also include in an instance when the particular video game player accepts the updated help session state and the updated help session state includes an achievement that occurred during the help session, updating a user database with a record indicating that the achievement occurred during the help session. The acts can also include outputting an indication that the particular video game player earned the achievement with assistance.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 6A, 6B, 6C, 6D, 6E, 6F, 6G, 6H, 6I, and 6J illustrate examples of graphical user interfaces associated with help sessions, consistent with some implementations of the present concepts.

FIG. 7 illustrates an example workflow for designating and detecting help session triggering conditions, consistent with some implementations of the present concepts.

DETAILED DESCRIPTION

Overview

Figure 1:
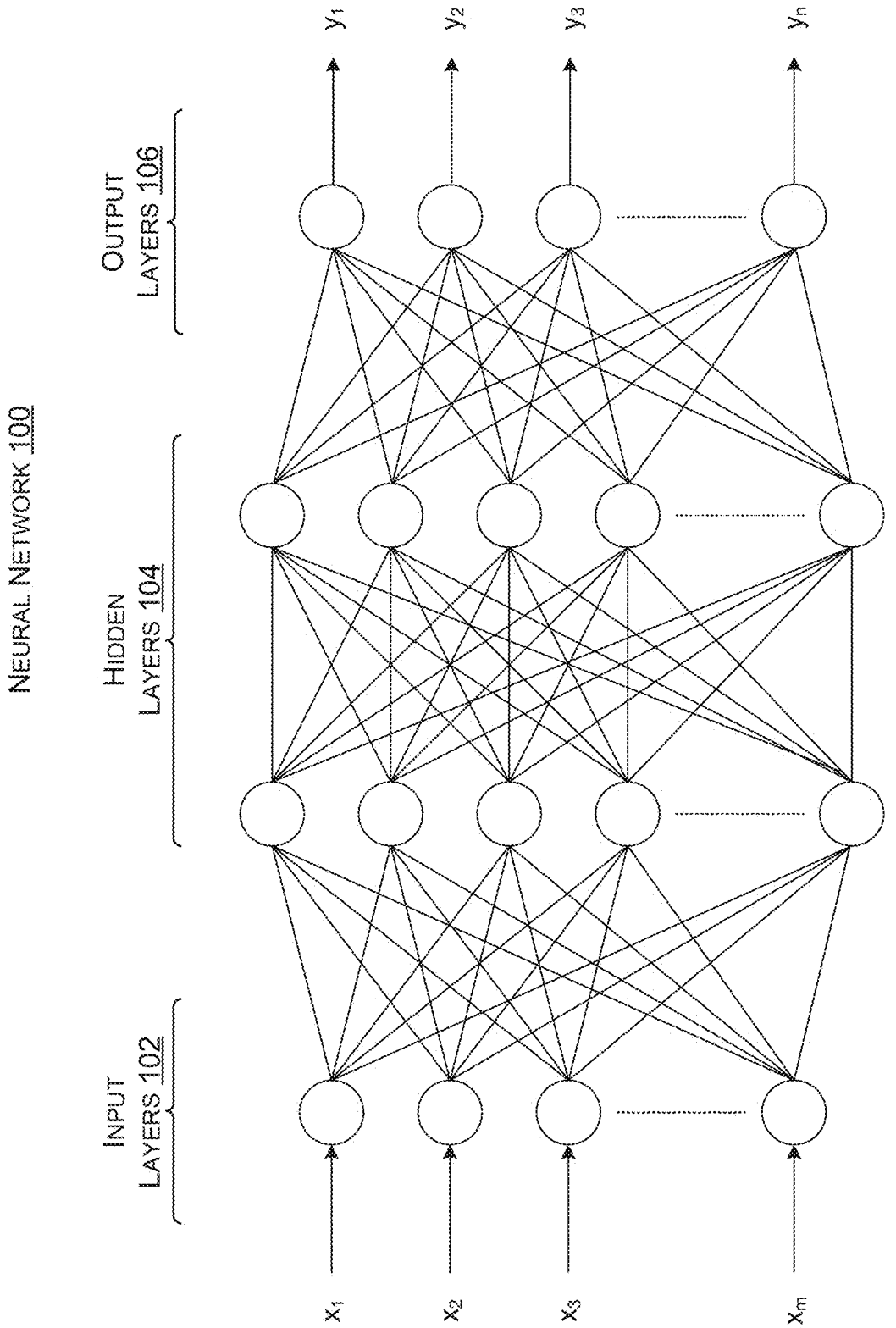
FIG. 1 illustrates an example machine learning model, consistent with some implementations of the present concepts.

As noted above, video game players sometimes seek help from other video game players to overcome in-game difficulties, often by consulting online forums or videos. However, while this type of help is widely available, it takes a great deal of effort for users to seek out the assistance they need to accomplish their goal. Furthermore, these techniques may take the video game players out of the gaming experience while they search for external help content. In other cases, video game players can be offered in-game assistance by a video game helper, but this can make it difficult to discern which actions are performed by the player being helped and which actions are performed by the player rendering assistance. In addition, this can make it difficult whether achievements were earned by the helper or the player receiving assistance.

The disclosed implementations aim to address these issues by using various techniques to track and represent help sessions where video game players are assisted by a helper, e.g., another video game player and/or a trained machine learning model. For instance, the disclosed implementations can graphically modify a controllable entity, such as a character or vehicle, to convey that the current video game player is being assisted by a helper. As another example, the disclosed implementations can graphically modify game achievements to indicate when a given achievement was earned with assistance from a helper.

Machine Learning Overview

There are various types of machine learning frameworks that can be trained to perform a given task, such as detecting triggering conditions and ending conditions for help sessions. Support vector machines, decision trees, random forests, and neural networks are just a few examples of suitable machine learning frameworks that have been used in a wide variety of other applications, such as image processing and natural language processing.

A support vector machine is a model that can be employed for classification or regression purposes. A support vector machine maps data items to a feature space, where hyperplanes are employed to separate the data into different regions. Each region can correspond to a different classification. Support vector machines can be trained using supervised learning to distinguish between data items having labels representing different classifications.

A decision tree is a tree-based model that represents decision rules using nodes connected by edges. Decision trees can be employed for classification or regression and can be trained using supervised learning techniques. Multiple decision trees can be employed in a random forest, which significantly improve the accuracy of the resulting model relative to a single decision tree. In a random forest, the individual outputs of the decision trees are collectively employed to determine a final output of the random forest. For instance, in regression problems, the output of each individual decision tree can be averaged to obtain a final result. For classification problems, a majority vote technique can be employed, where the classification selected by the random forest is the classification selected by the most decision trees.

A neural network is another type of machine learning model that can be employed for classification or regression tasks. In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs.

Various training procedures can be applied to learn the edge weights and/or bias values of a neural network. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, decoding, alignment, prediction, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned, e.g., individualized tuning to one or more particular users. Note that two trained models can share the same model structure and yet have different values for the internal parameters, e.g., if the two models are trained on different training data or if there are underlying stochastic processes in the training process.

Terminology

The term "prior gameplay data," as used herein, refers to various types of data associated with gameplay of a video game. Prior gameplay data can include gameplay sequences, e.g., of inputs to a video game and/or outputs of the video game during prior gaming sessions. Prior gameplay data can also include communication logs relating to the game, such as in-game chat or voice sessions or external data such as forum posts regarding a particular game. Prior gameplay data can also include platform data collected by a video gaming platform, such as an online game playing service utilized by multiple video games or an operating system that runs on a gaming console. Prior gameplay data can also include instrumented game data that can be stored by the video game itself during execution for subsequent evaluation. Note that prior gameplay data can include very recent gameplay data obtained in real-time from live video game play.

The term "achievement," as used herein, refers to any goal that can be recorded in association with video game play. In some implementations, achievements can be tracked by a gaming platform. In other cases, achievements can be tracked by individual video games. Achievements can include platform achievements granted by a platform, levels or bosses defeated in a video game, achieving scoring thresholds, acquiring items in inventory, playing a game for a designated amount of time, etc.

The term "help session criteria," as used herein, refers to criteria used to evaluate prior gameplay data associated with a particular video game to determine whether a given video game condition is designated as a help session triggering condition. For example, help session criteria can include disengagement criteria indicating that video game players choose to temporarily disengage (e.g., cease playing) or permanently disengage from a particular video game under certain conditions. Help session criteria can also include goal difficulty criteria indicating the relative difficulty of a particular in-game goal that occurs under certain conditions, such as an earning an achievement, completing a level, or defeating an enemy. Help session criteria can also include negative consequence criteria indicating when video game players have experienced negative consequences such as dying, losing important items or health points, crashing, etc., under certain game conditions.

A "help session" is an experience that occurs to assist a video game player with a particular portion of a video game. For instance, a help session can include a tutorial, e.g., text, chat, or video-based. A help session can also include transferring control of a video game session to another game player that temporarily takes over control of a video game until the help session is completed. The other game player can be a human being or, in some cases, a machine learning model. A "help session starting state" is a state of a video game used to start a help session. A help session starting state can be a previously-saved state or a current state of a video game. An "updated help session state" is a state of a video game that occurs as a result of inputs directed to the video game during a help session. A "helper" or "video game helper" is a human or machine learning model that plays a video game during a help session. During the help session, a video game helper can control a "controllable entity," such as a character or vehicle, to assist the current video game player.

The term "generative model," as used herein, refers to a machine learning model employed to generate new content. One type of generative model is a "generative language model," which is a model that can generate new sequences of text given some input. One type of input for a generative language model is a natural language prompt, e.g., a query potentially with some additional context. For instance, a generative language model can be implemented as a neural network, e.g., a long short-term memory-based model, a decoder-based generative language model, etc. Examples of decoder-based generative language models include versions of models such as ChatGPT, BLOOM, PaLM, Mistral, Gemini, and/or LLAMA. Generative language models can be trained to predict tokens in sequences of textual training data. When employed in inference mode, the output of a generative language model can include new sequences of text that the model generates.

Another type of generative model is a "generative image model," which is a model that generates images or video. For instance, a generative image model can be implemented as a neural network, e.g., a generative image model such as one or more versions of Stable Diffusion, DALL-E, Sora, or GENIE. A generative image model can generate new image or video content using inputs such as a natural language prompt and/or an input image or video. One type of generative image model is a diffusion model, which can add noise to training images and then be trained to remove the added noise to recover the original training images. In inference mode, a diffusion model can generate new images by starting with a noisy image and removing the noise.

In some cases, a generative model can be multi-modal. For instance, a multi-modal generative model may be capable of using various combinations of text, images, video, audio, application states, code, or other modalities as inputs and/or generating combinations of text, images, video, audio, application states, or code or other modalities as outputs. Here, the term "generative language model" encompasses multi-modal generative models where at least one mode of output includes natural language tokens. Likewise, the term "generative image model" encompasses multi-modal generative models where at least one mode of output includes images or video. Examples of multi-modal generative models include CLIP models, certain GPT variants such as GPT-4o, Gemini, etc. The term "prompt," as used herein, refers to input provided to a generative model that the generative model uses to generate outputs. A prompt can be provided in various modalities, such as text, an image, audio, video, etc.

The term "machine learning model" refers to any of a broad range of models that can learn to generate automated user input and/or application output by observing properties of past interactions between users and applications. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels or rewards.

Example Neural Network

FIG. 1 shows a deep neural network 100 with input layers 102, hidden layers 104, and output layers 106. The input layers can receive features $x_1$ through $x_m$. For instance, the features can relate to prior or current gameplay data for one or more video games, and can include features relating to gameplay sequences by one or more players, features relating to communication logs from players discussing the video game, features relating to platform data collected by a gaming platform that executes the video game, and/or game data (e.g., telemetry) collected by the video game itself when executing.

The input layers 102 can feed into the hidden layers 104. The hidden layers calculate values based on the inputs received from the input layers, and feed results of the calculations into the output layers 106. The output layers can output values $y_1$ through $y_n$. For instance, the output values can characterize any aspect of video game play at any point during the video game. In some cases, the output values are calculated using a regression approach, and in other cases using a classification approach.

In a regression approach, the output values can characterize any aspect of a video game using a numerical value. For instance, one output layer could generate a value indicating a predicted difficulty level of an achievement, another output layer could output a value indicating a predicted disengagement rating for a specific video game scenario, etc. As another example, the output layers could produce values indicating the relative probability of selecting a particular helper for a particular segment of a video game.

In a classification approach, the output values can include probability distributions over two or more classes. For instance, one output layer could output a binary probability distribution that a user will stop playing a video game under certain circumstances, another output layer could output a binary probability distribution that the user will accept a help session, etc. As another example, the output layers could produce values indicating whether a particular helper is qualified for helping in a particular help session.

Neural network 100 is shown with a general architecture that can be modified depending on the task being performed by the neural network. For instance, neural networks can be implemented with convolutional layers to implement a computer vision model or as a transformer encoder/decoder architecture to implement a generative language or multimodal generative. Neural networks can also have recurrent layers such as long short-term memory networks, gated recurrent units, etc.

Example Computer Vision Model

Figure 2:
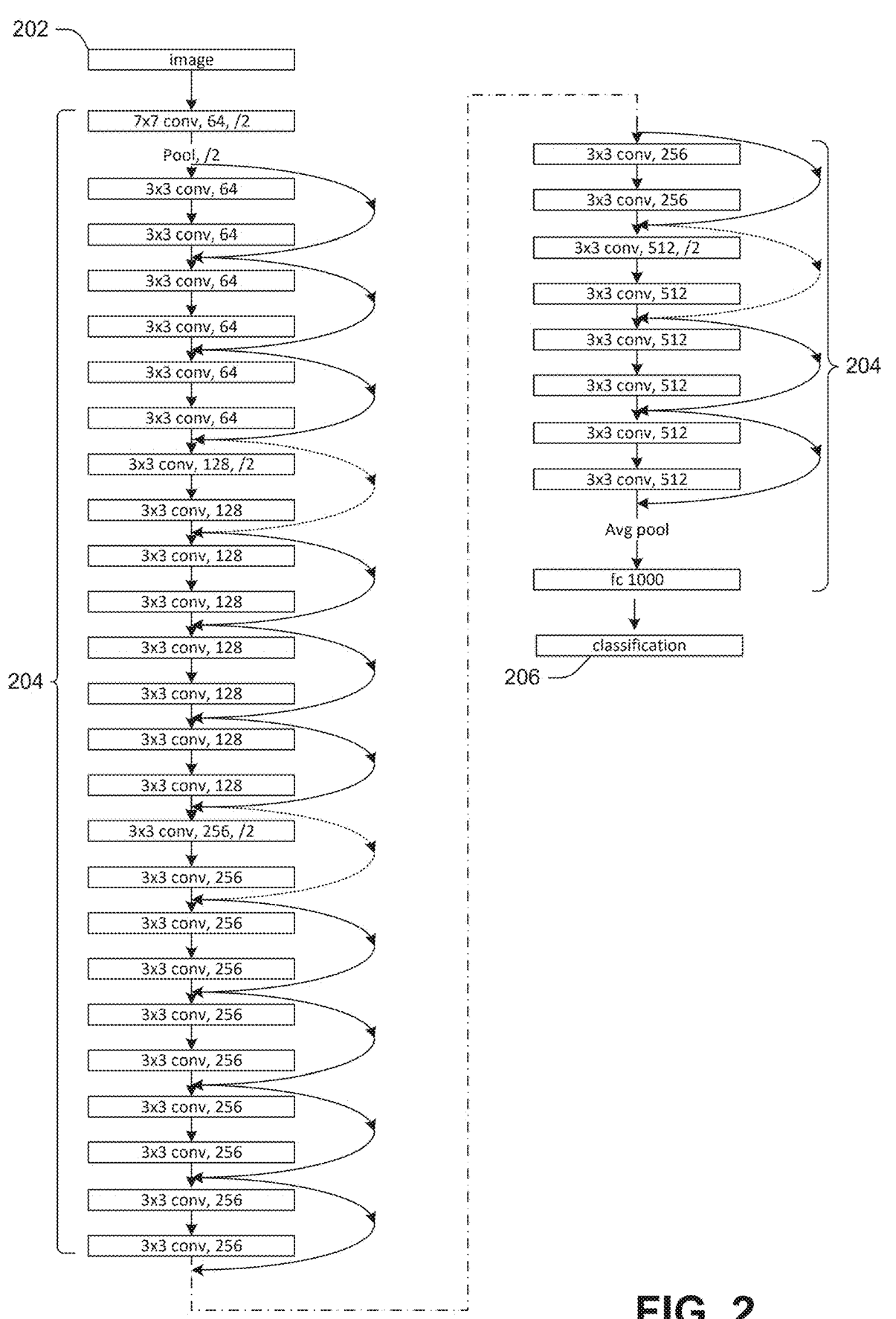
FIG. 2 illustrates an example computer vision model, consistent with some implementations of the present concepts.

While FIG. 1 illustrates a general architecture of a neural network, FIG. 2 illustrates a particular example of a neural network model for computer vision. For instance, FIG. 2 shows an image 202 being classified by a computer vision model 204 to determine an image classification 206. For instance, the image can include part or all of a video frame output by a video game, and computer vision model 204 can be a ResNet model (He, et al., "*Deep Residual Learning for Image Recognition,*" in Proceedings of the IEEE Conference on Computer Vision and Pattern Recognition, 2016, pp. 770-778). The computer vision model can include a number of convolutional layers, most of which have 3×3 filters. Generally, given the same output feature map size, the convolutional layers have the same number of filters. If the feature map size is halved by a given convolutional layer (as shown by "/2" in FIG. 2), then the number of filters can be doubled to preserve the time complexity across layers.

After the image has been processed using a series of convolutional layers, the image is processed in a global average pooling layer. The output of the pooling layer is processed with a 1000-way fully-connected layer with softmax. The fully-connected layer can be used to determine a classification, e.g., an object category of an object in image 202.

The respective layers within computer vision model 204 can have shortcut connections which perform identity operations:

$$y = F(x, \{W_i\}) + x \qquad (1)$$

where x and y are the input and output vectors of the layers involved and $F(x, \{W_i\})$ represents the residual mapping to be learned. In some connections the dimensions increase across layers (shown as dotted lines in FIG. 2). In these cases, the following projection can be employed to match the dimensions via 1×1 convolutions:

$$y = F(x, \{W_i\}) + W_s x \qquad (2)$$

In some implementations, computer vision model 204 can be pretrained on a large dataset of images, such as ImageNet. Such a general-purpose image database can provide a vast number of training examples that allow the model to learn weights that allow generalization across a range of object categories. Said another way, computer vision model 204 can be pretrained in this fashion.

After pretraining, computer vision model 204 can be tuned on another, smaller dataset for categories of interest. For instance, tuning datasets can be provided for specific video games, genres of video games, etc. As one example, some genres of video games tend to have health status bars or important, powerful enemies ("bosses"), and computer vision model 204 could be tuned to detect health status and/or boss fight scenarios using training data from multiple games from a particular genre. For instance, the training data could include video frames with associated labels, e.g., either manually-labeled health bars or boss fights or implicit labels obtained from user chat logs, forum discussions, etc.

Example Decoder-Based Generative Language Model

Figure 3:
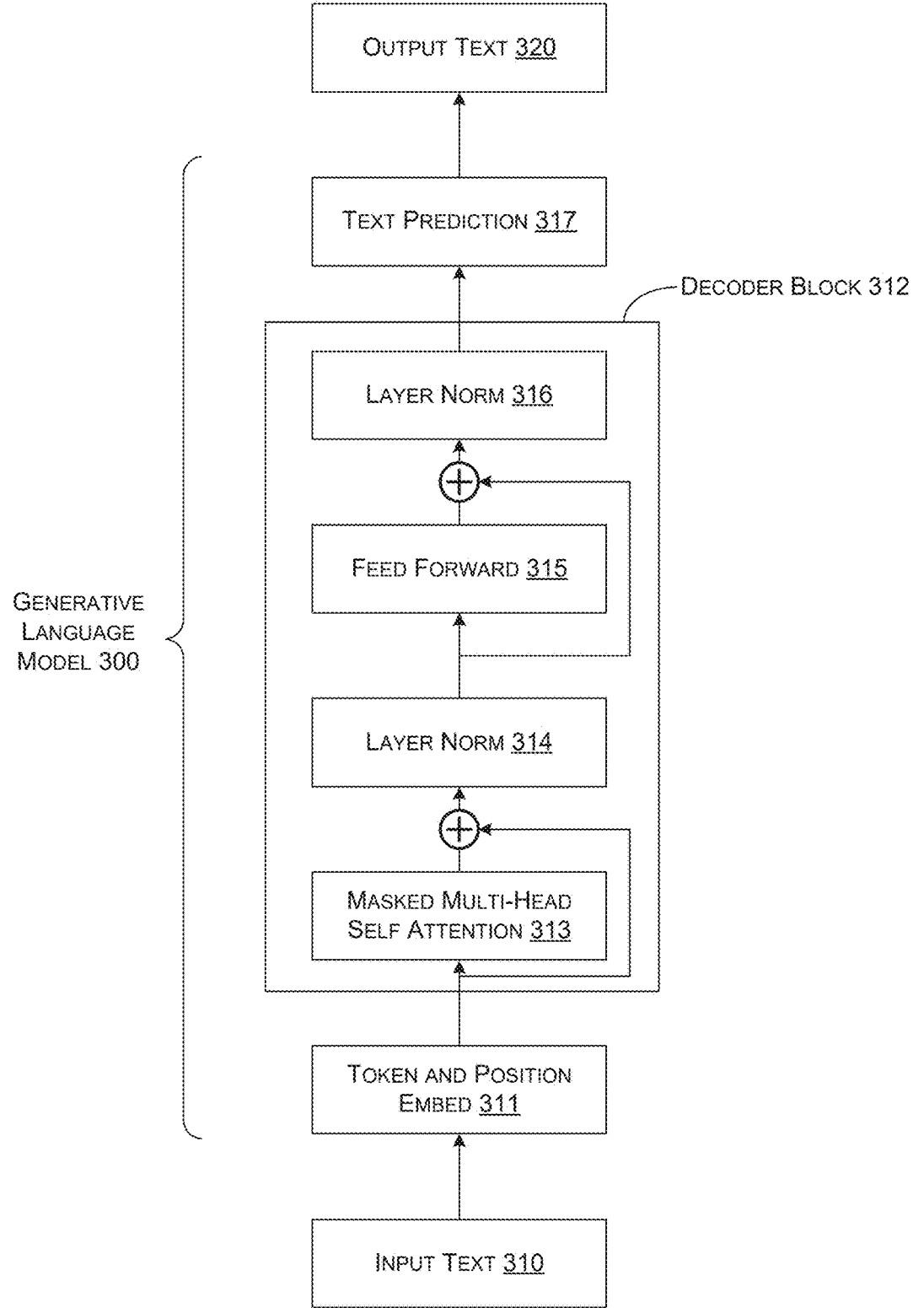
FIG. 3 illustrates an example generative language model, consistent with some implementations of the present concepts.

While FIG. 1 illustrates a general architecture of a neural network, FIG. 3 illustrates a particular example of a neural network model for language generation. Specifically, FIG. 3 illustrates an exemplary generative language model 300 (e.g., a transformer-based decoder) that can be employed using the disclosed implementations. Generative language model 300 is an example of a machine learning model that can be used to perform one or more natural language processing tasks that involve generating text, as discussed more below. For the purposes of this document, the term "natural language" means language that is normally used by human beings for writing or conversation.

Generative language model 300 can receive input text 310, e.g., a prompt from a user or a prompt generated automatically by machine learning using the disclosed techniques. For instance, the input text can include words, sentences, phrases, or other representations of language. The input text can be broken into tokens and mapped to token and position embeddings 311 representing the input text. Token embeddings can be represented in a vector space where semantically-similar and/or syntactically-similar embeddings are relatively close to one another, and less semantically-similar or less syntactically-similar tokens are relatively further apart. Position embeddings represent the location of each token in order relative to the other tokens from the input text.

The token and position embeddings 311 are processed in one or more decoder blocks 312. Each decoder block implements masked multi-head self-attention 313, which is a mechanism relating different positions of tokens within the input text to compute the similarities between those tokens. Each token embedding is represented as a weighted sum of other tokens in the input text. Attention is only applied for already-decoded values, and future values are masked. Layer normalization 314 normalizes features to mean values of 0 and variance to 1, resulting in smooth gradients. Feed forward layer 315 transforms these features into a representation suitable for the next iteration of decoding, after which another layer normalization 316 is applied. Multiple instances of decoder blocks can operate sequentially on input text, with each subsequent decoder block operating on the output of a preceding decoder block. After the final decoding block, text prediction layer 317 can predict the next word in the sequence, which is output as output text 320 in response to the input text 310 and also fed back into the language model. The output text can be a newly-generated response to the prompt provided as input text to the generative language model. Generative language model 300 can be trained using techniques such as next-token prediction or masked language modeling on a large, diverse corpus of documents. For instance, the text prediction layer 317 can predict the next token in a given document, and parameters of the decoder block 312 and/or text prediction layer can be adjusted when the predicted token is incorrect. In some cases, a generative language model can be pretrained on a large corpus of documents (Radford, et al., "Improving language understanding by generative pre-training," 2018). Then, a pretrained generative language model can be tuned using a reinforcement learning technique such as reinforcement learning from human feedback ("RLHF"). In other examples, a generative language model could be tuned using training data from a specific video game or games from a particular genre to determine when various help session criteria are met, to characterize in-game conditions relative to help session criteria, and/or to select a helper for a particular help session.

Example Adventure Game Sequences

Figure 4A:
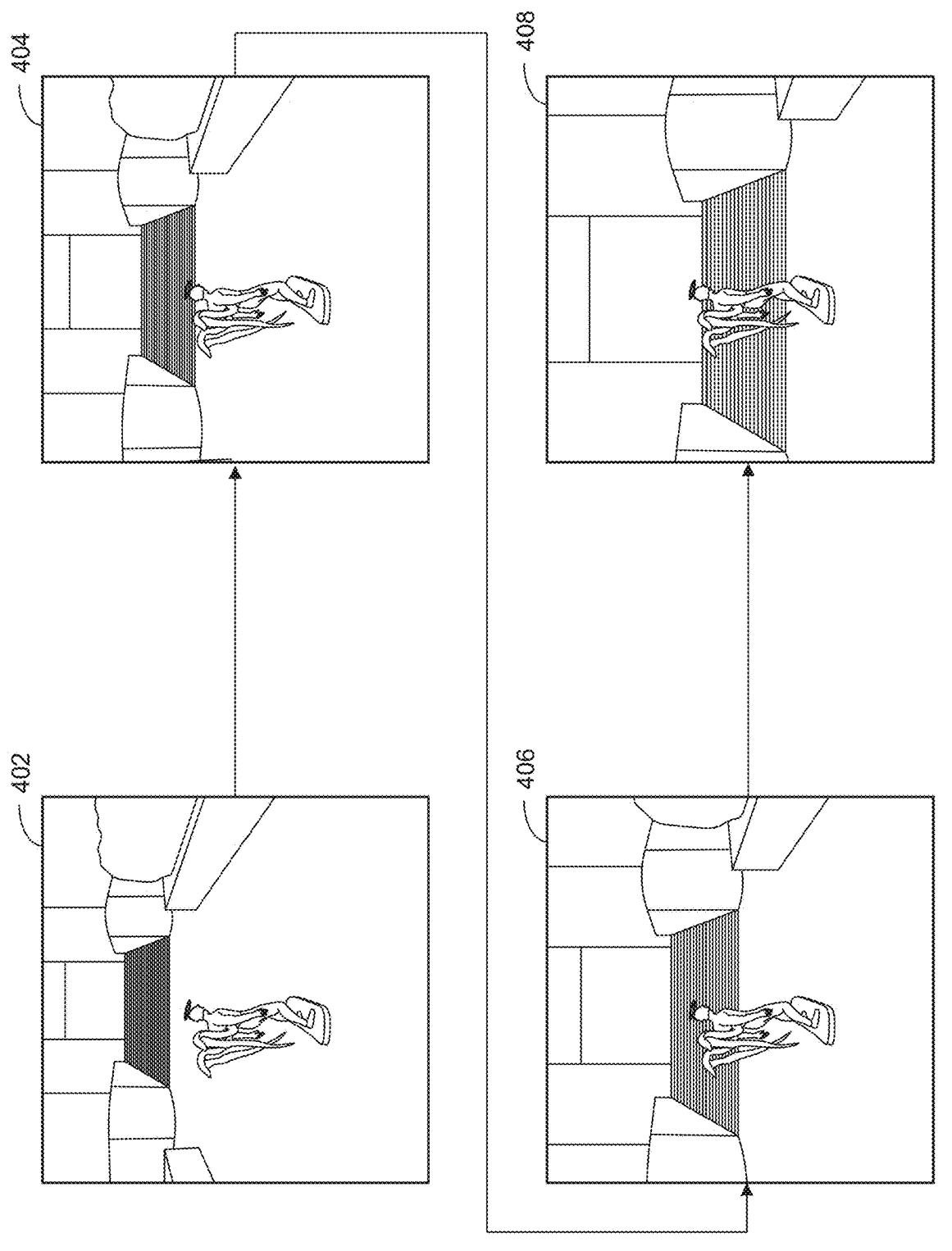
FIGS. 4A and 4B illustrate example help session triggering conditions for a first video game, consistent with some implementations of the present concepts.
Figure 4B:
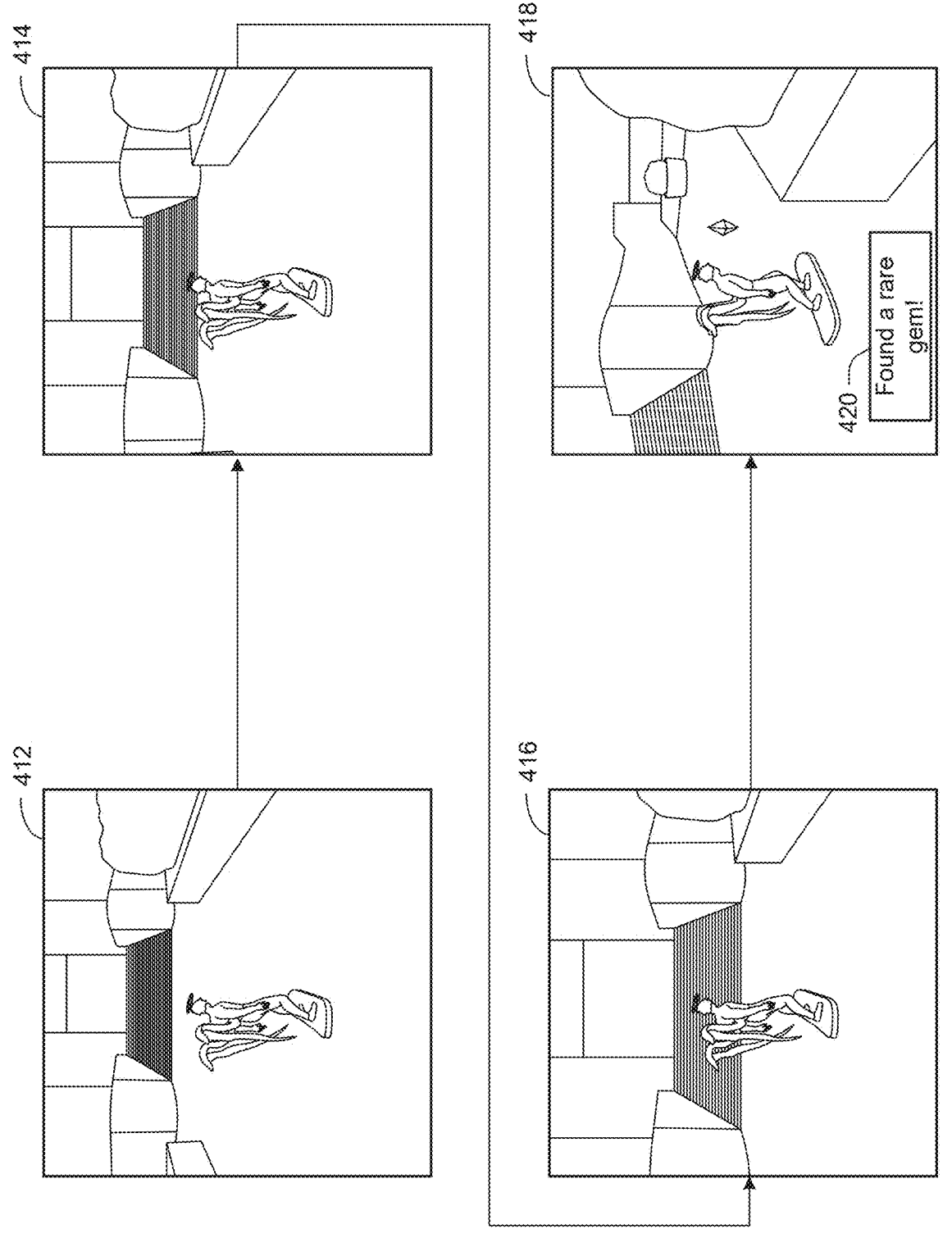

FIG. 4A shows a sequence of frames from an adventure game where a video game player controls a character riding a hoverboard. The character moves forward through frame 402, frame 404, frame 406, and frame 408, looking for a rare gem. However, the video game player is unsuccessful at finding the rare gem in this sequence of frames. FIG. 4B shows a sequence of frames from the adventure game where the character moves through a similar sequence of frames. Frame 412 is similar to frame 402, frame 414 is similar to frame 404, and frame 416 is similar to frame 406. However, unlike frame 408, at frame 418 the character turns to the right and finds a rare gem. An achievement 420 is displayed in frame 418 indicating that the user has found a rare gem.

For the purposes of the following discussion, assume that many video game players struggle with finding the rare gem and that FIG. 4A illustrates a relatively common sequence of frames. In other words, users tend to navigate too far without turning to the right at the proper time and thus do not find the rare gem. Said another way, finding the rare gem is a difficult in-game goal. Further, assume that many video game players also tend to disengage from gameplay as a result of getting frustrated by not finding the rare gem. As described more below, this can be mitigated by identifying a help session triggering condition in the video game when a current video game player is in the vicinity of the rare gem, and offering that player assistance at finding the rare gem during a help session. The help session can be automatically ended when the current video game player finds the rare gem, e.g., finding the rare gem can be designated as a help session ending condition.

Example Racing Game Sequences

Figure 5A:
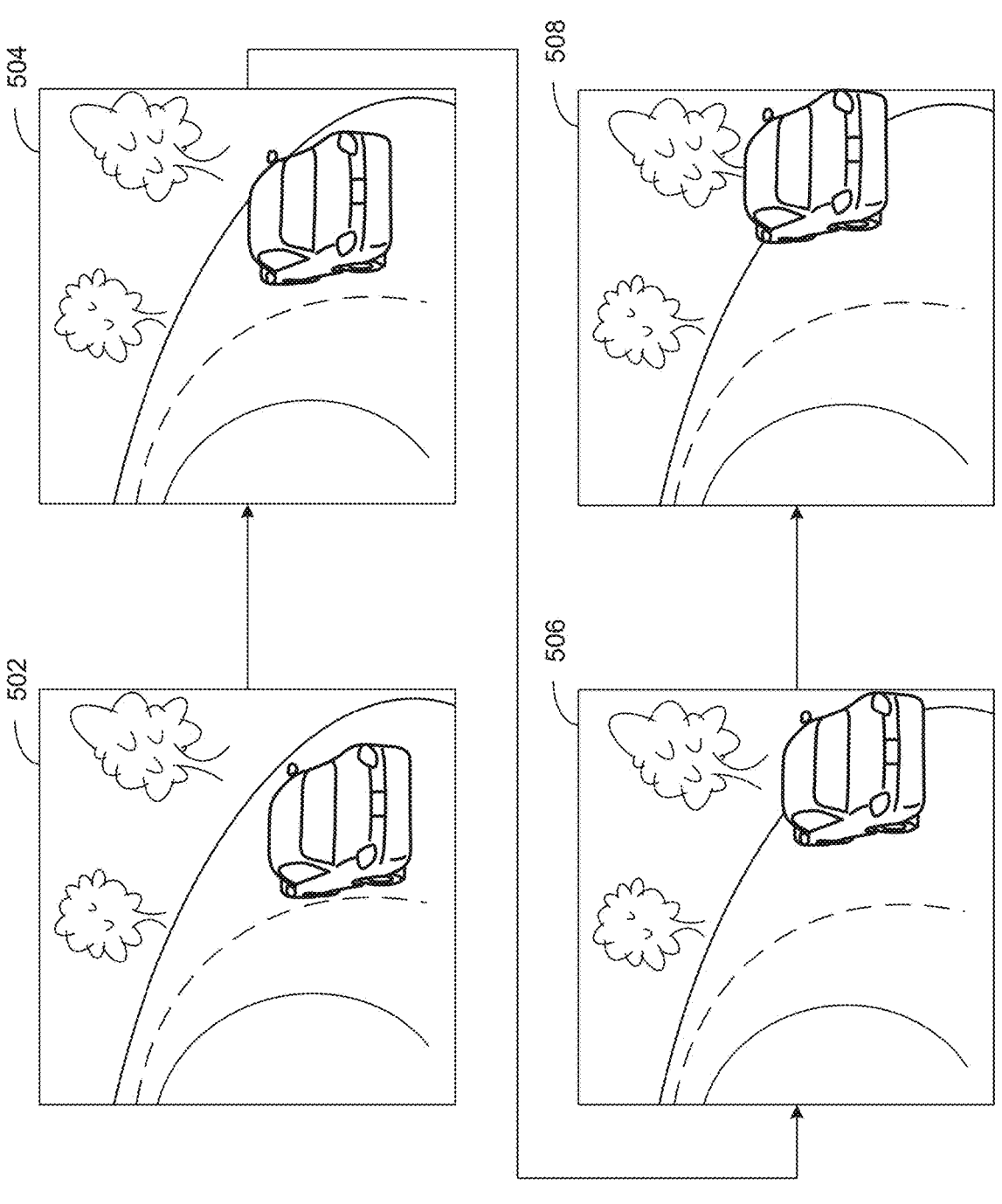
FIGS. 5A and 5B illustrate example help session triggering conditions for a second video game, consistent with some implementations of the present concepts.
Figure 5B:
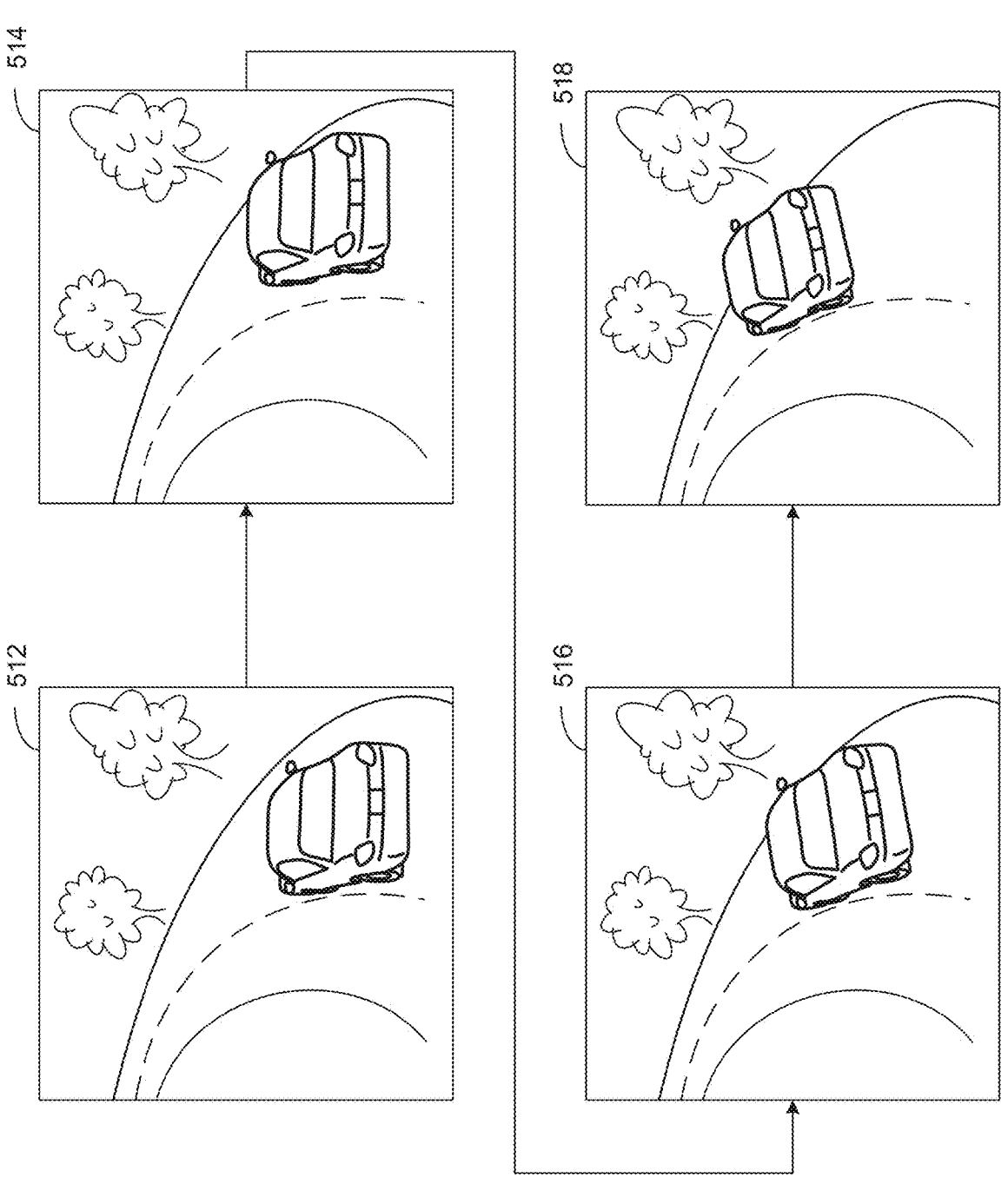

FIG. 5A shows a sequence of frames from a racing game where a video game player controls a car along a road course. The car moves forward through frame 502, frame 504, frame 506, and frame 508, eventually crashing into a tree. FIG. 5B shows a sequence of frames from the racing game where the car starts at a similar location in frame 512 to the location shown in frame 502. However, in frame 514, the car takes a different path that proceeds through frames 516 and 518, successfully staying on the road course without crashing into the tree.

For the purposes of the following discussion, assume that many video game players struggle with running into the tree, and that FIG. 5A illustrates a relatively common sequence of frames. In other words, video game players tend to misjudge this particular turn and veer into the tree rather than staying on the road when playing the game. Said another way, running into the tree is a common negative in-game consequence in the racing game. Further, assume that many video game players also tend to disengage from gameplay as a result of getting frustrated by running into the tree. As described more below, this can be mitigated by identifying a help triggering condition in the video game when a current video game player is approaching the tree and offering the current video game player assistance at successfully navigating the turn during a help session. The help session can be automatically ended when the current video game player successfully navigates the turn, e.g., passing the tree without crashing can be designated as a help session ending condition.

Example Adventure Game Help Session

FIGS. 6A through 6J collectively illustrate graphical user interfaces associated with an example help session experience relating to the adventure video game introduced previously.

Figure 6A:
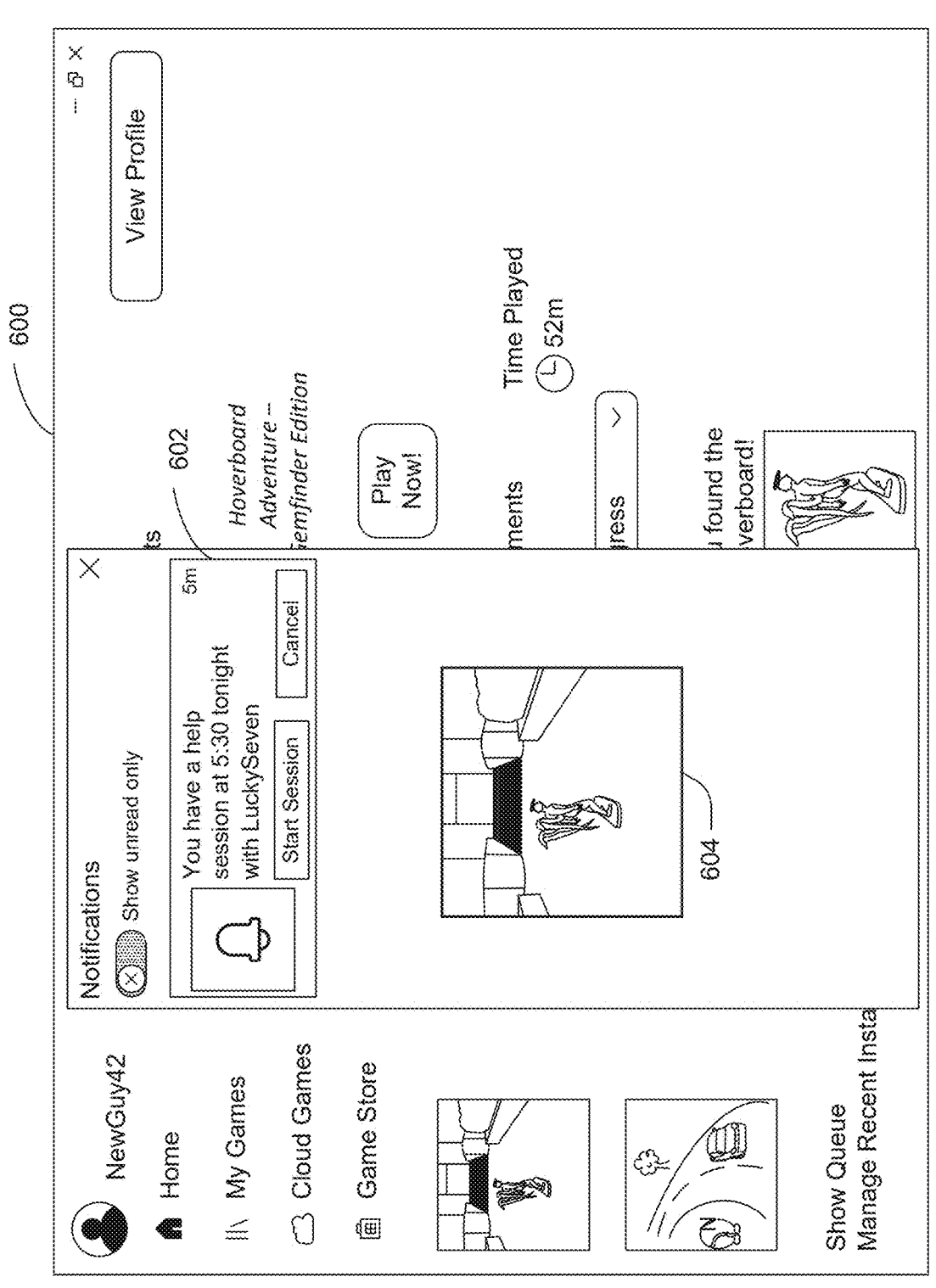

FIG. 6A shows a user page 600 that can be accessed by a user, e.g., via an operating system of a console client device. The user page shows a help session appointment notification 602 and a video frame 604 associated with a help session starting state of the help session. The help session starting state corresponds to the beginning of a segment in the game where the current video game player, NewGuy42, has either manually requested help or has accepted an automated suggestion to receive help via a help session.

Figure 6B:
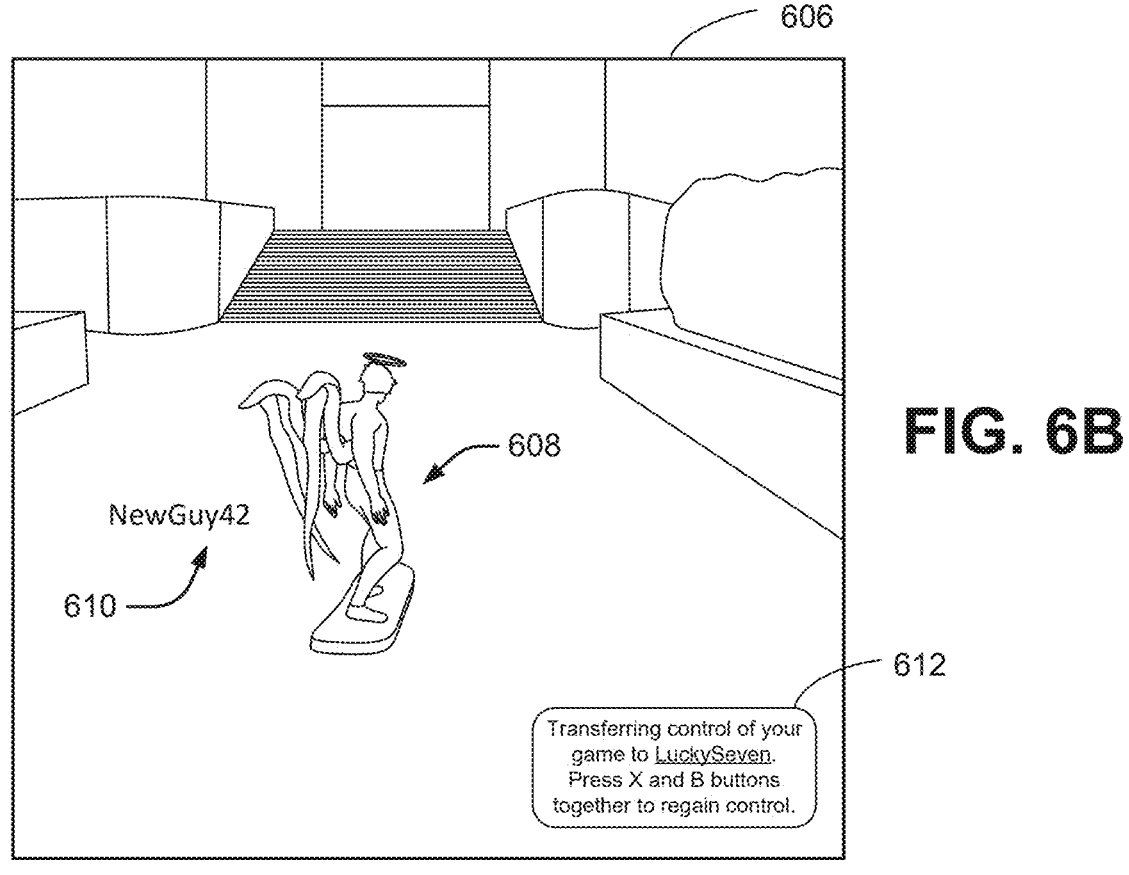

Next, assume NewGuy42 requests to start the help session. The adventure game is executed and starts at the help session starting state. As shown in FIG. 6B, a video frame 606 is displayed. Note that character 608 is shown in solid lines, and a gamer name 610 is shown next to the character. In addition, a help session transfer notification 612 is shown indicating control is being transferred to the helper.

Figure 6C:
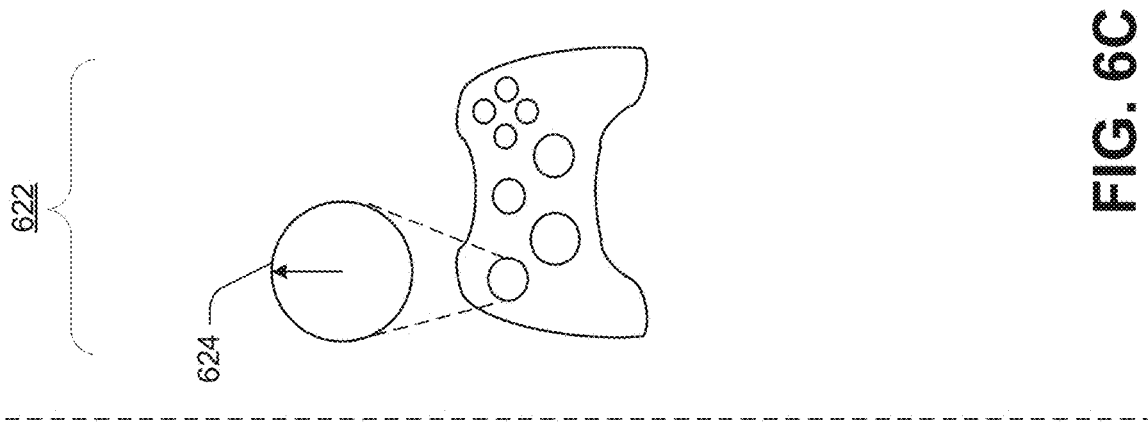

Next, as shown in FIG. 6C, the user interface updates to show video frame 614. Video frame 614 includes a visually-modified character 616 and a modified username 618. The visually-modified character and the modified username both convey that NewGuy42 is currently being assisted by a helper. A chat dialog 620 is displayed along with a video game controller representation 622. In the chat dialog, the helper explains how to move the character to achieve the in-game goal of finding the rare gem. The video game controller representation shows the inputs provided by the helper to their own video game controller during the help session, and includes a joystick representation 624, which employs an arrow to show the direction in which the helper's joystick is pointed to maneuver the character.

Figure 6D:
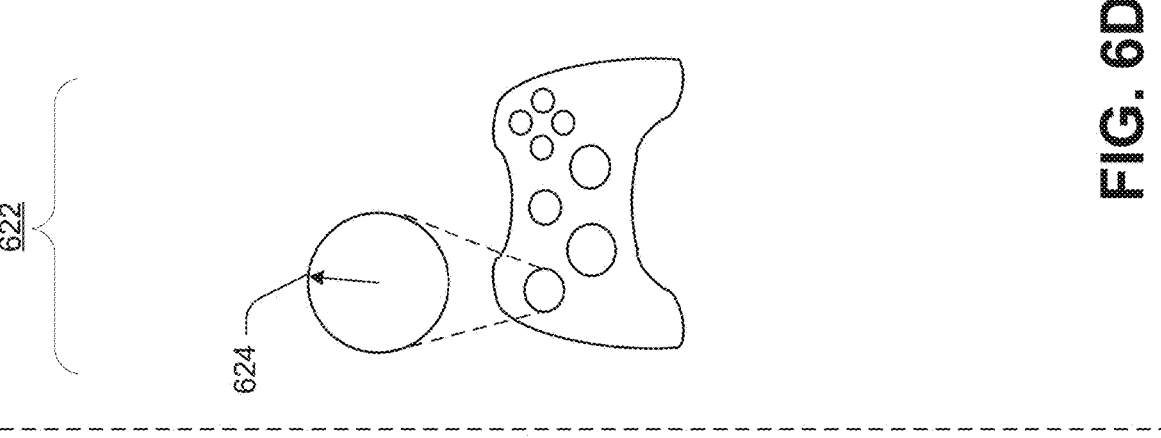
Figure 6E:
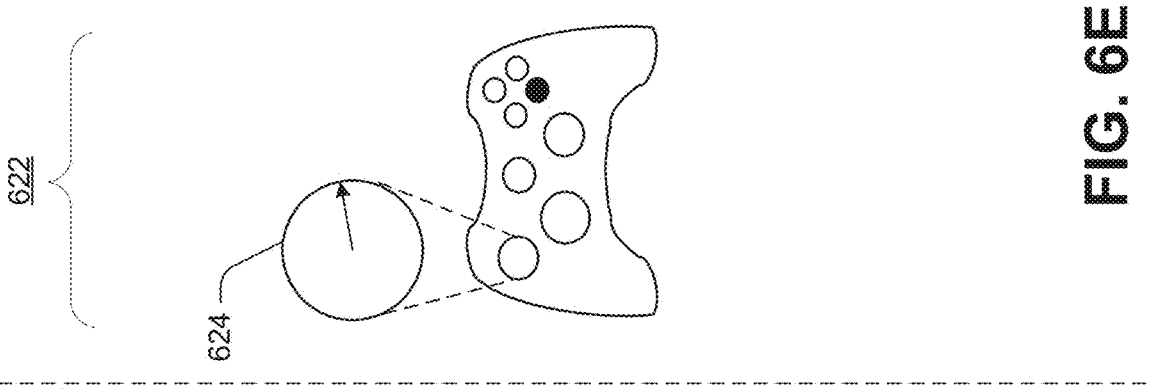

Next, in FIG. 6D, the modified character 616 continues along the path as shown in video frame 626. The helper explains that the character is "almost there", and the joystick representation 624 remains pointed nearly straight ahead. Next, in FIG. 6E, the character continues as shown in frame 628, the joystick representation 624 moves to the right, and the bottom button on controller representation 622 is now black to indicate this button has been pressed. The chat dialog 620 also explains that this is a point in the video game where many players do not look here, and most continue to go up the stairs.

Figure 6F:
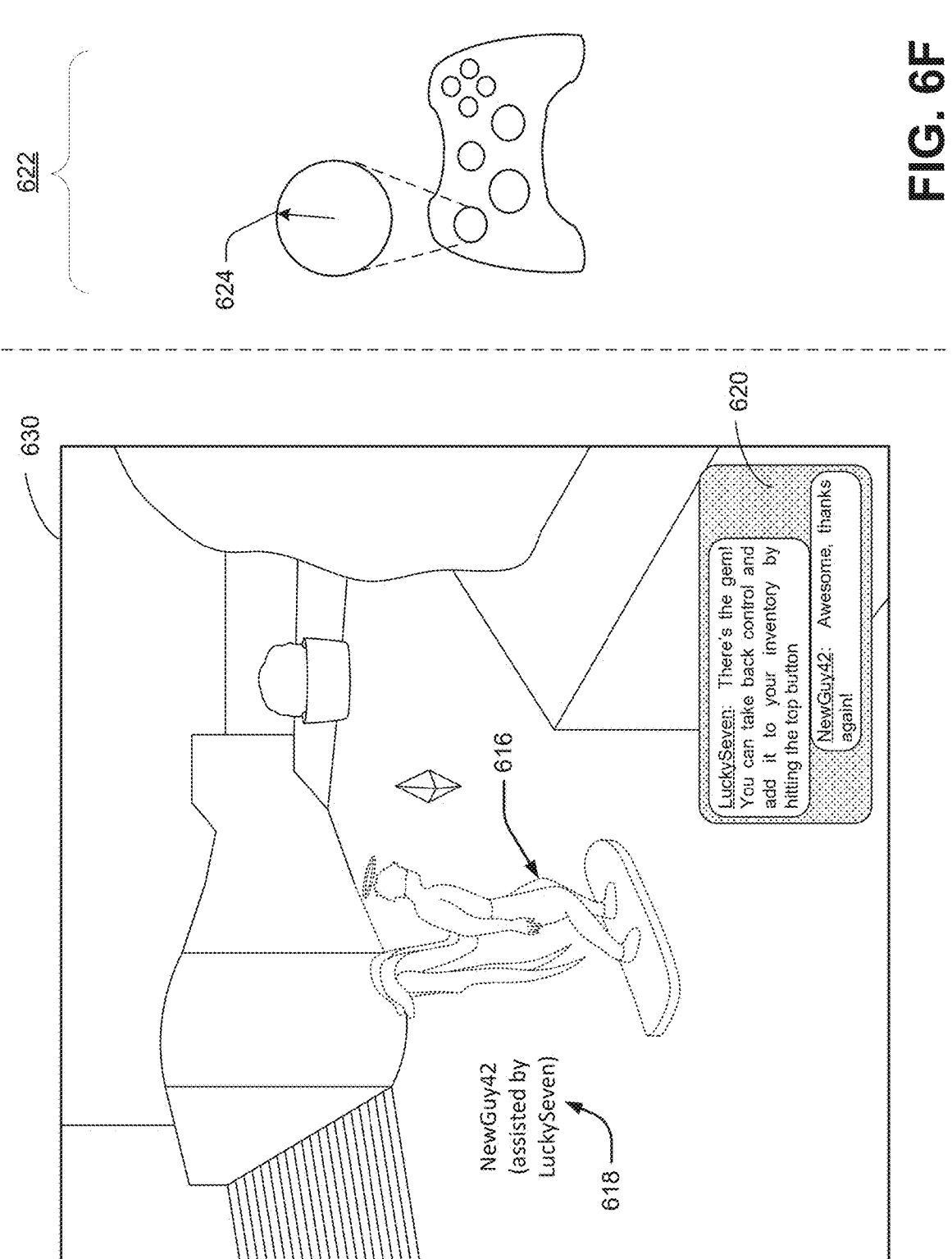

Next, in FIG. 6F, a rare gem is visible in video frame 630. At this time, control can return to the current video game player, e.g., the presence of the rare gem in the current video game frame can be designated as a help session ending condition. Note that the help session can be automatically ended at this point according to a help session ending condition, e.g., indicating that the rare gem was found and/or based on a comparison of an embedding representing the video frame 630 an average embedding of successful help sessions that resulted in finding the rare gem. Alternatively, NewGuy42 and/or LuckySeven can press a designated control sequence to return control to NewGuy42.

Figure 6G:
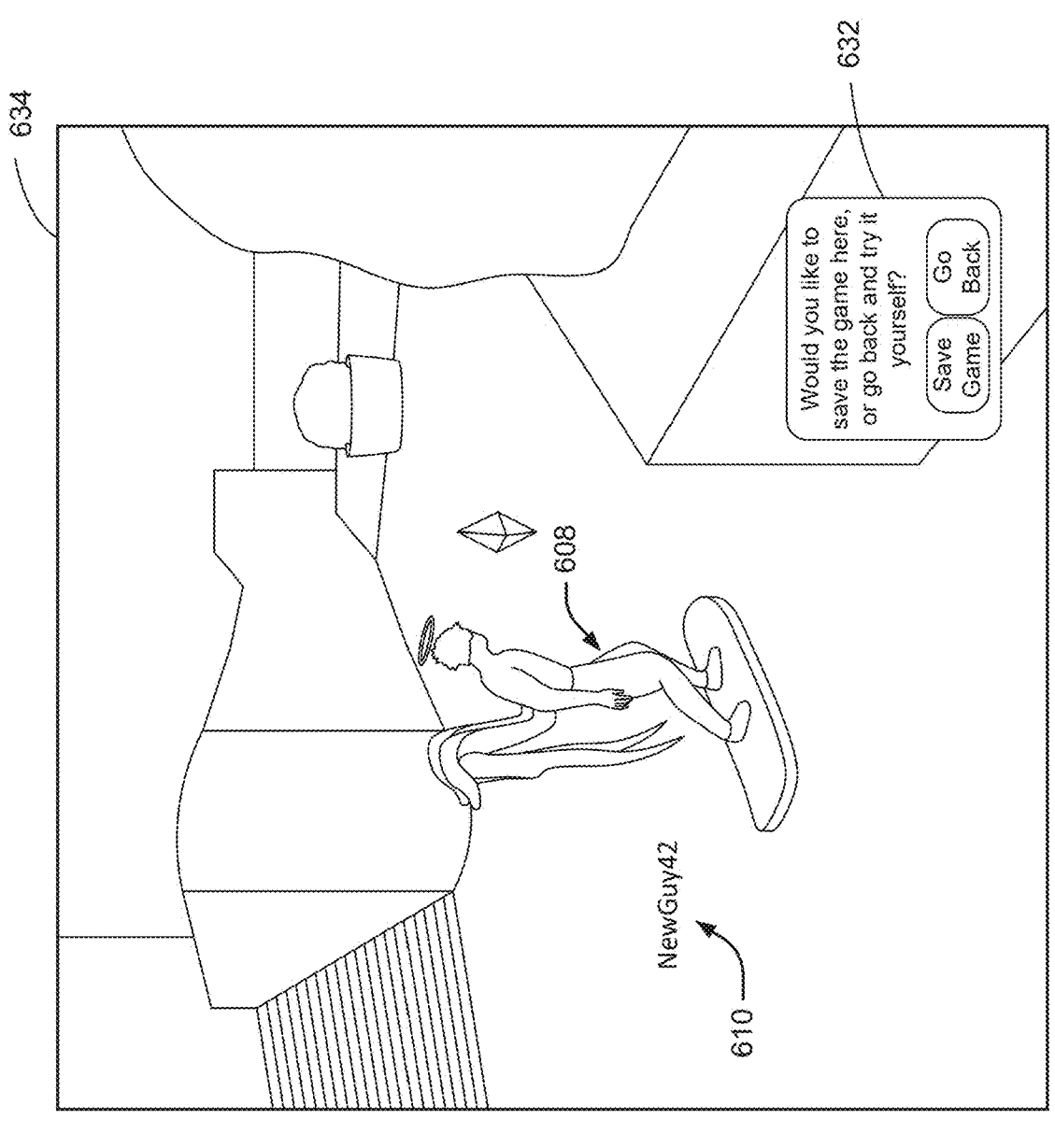

Next, in FIG. 6G, a help session acceptance option 632 is displayed on video frame 634. If the current video game player wishes to accept the option, the updates state of the video game can be loaded into the current video gaming session. Then, the current video game player can resume play from that state, e.g., having just found the rare gem. If the help session acceptance option is rejected, the current video game session can return to the help session starting state and the current video game player can attempt to find the rare gem themselves. Note also that, since control has reverted to the current game player, character 608 is again shown in solid lines and gamer name 610 no longer indicates the player is being helped.

Figure 6H:
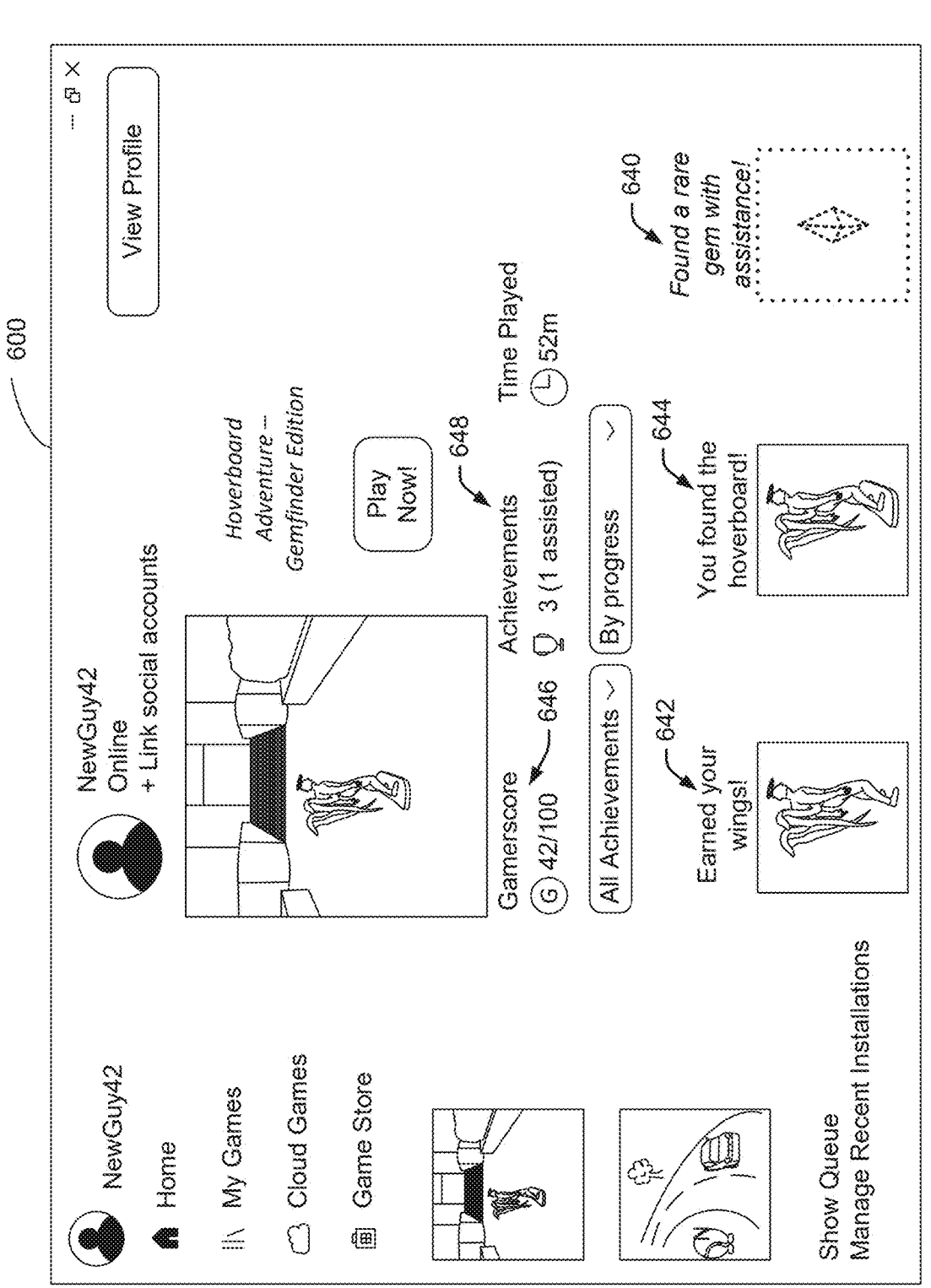

FIG. 6H shows user page 600 updated with an assisted achievement indication 640. Note that user page 600 also includes previously-earned achievements that were earned without assistance via an achievement indication 642 and achievement indication 644. The user page also includes a gamerscore 646 and achievement count 648. Here, the achievement count conveys the total number of achievements (3) as well as indicating that one of the achievements (finding the rare gem) was obtained with assistance.

Figure 6I:
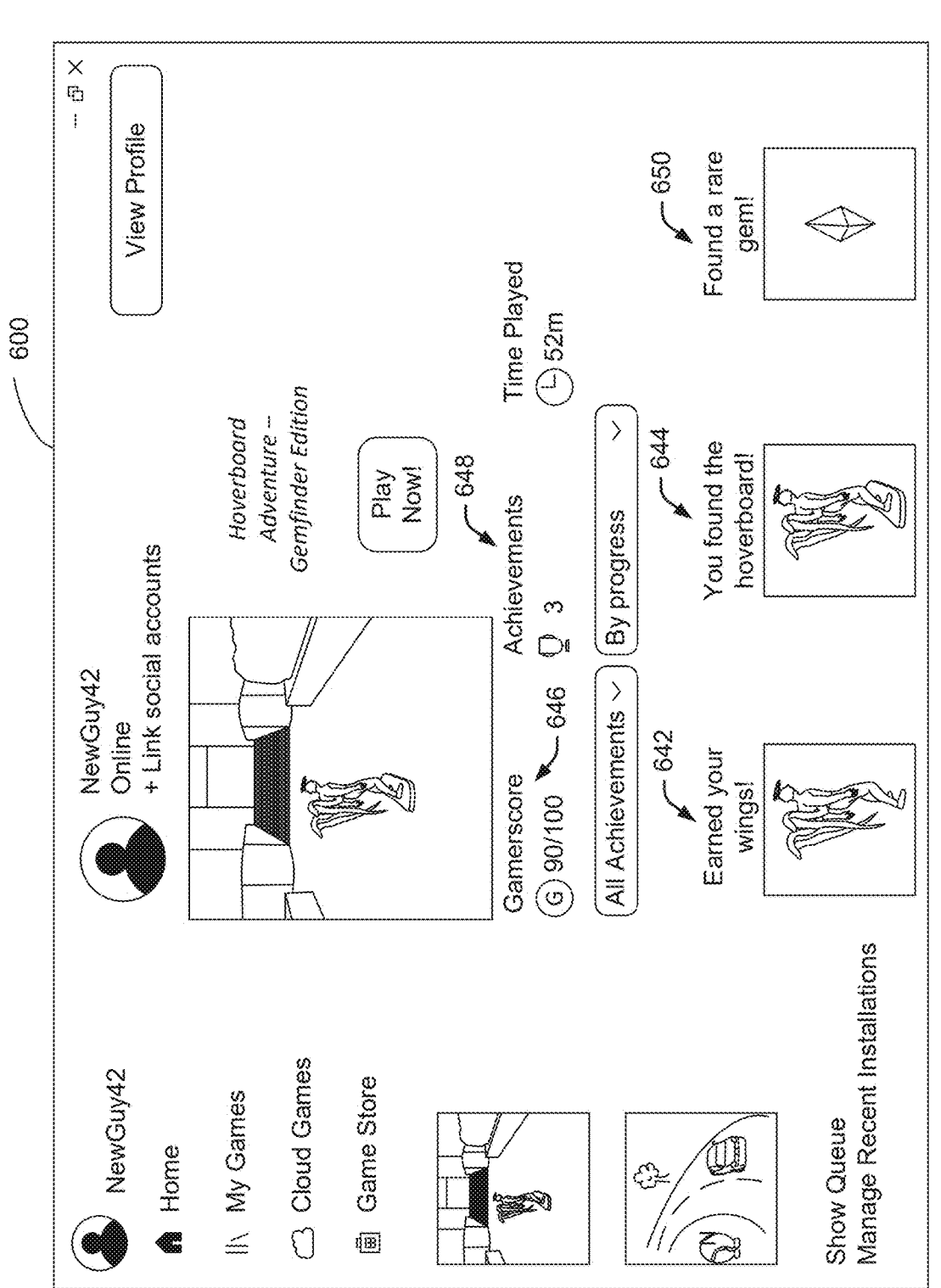

Next, assume that at a later time NewGuy42 reverts to a previous game state and finds the rare gem on their own, without assistance. In this case, the assisted achievement can be cleared by replacing the assisted achievement indication. FIG. 6I shows user page 600 updated with an achievement indication 650, reflecting that NewGuy42 has now earned the achievement of finding the rare gem without assistance.

FIG. 6J shows a user page 660 for LuckySeven, which shows a helper achievement indication 662 for helping one user find the rare gem. More generally, the disclosed implementations can involve granting separate helper achievements for any achievement associated with a video game. User page 660 also shows helper achievement indication 664 and helper achievement indication 666, which indicate some other achievements that LuckySeven has helped other video game players earn. The user page also includes a gamerscore 668 and achievement count 670. Note the achievement count distinguish the total number of achievements by LuckySeven (32) as well as the number from that total that are helper achievements (14).

Example Workflow

FIG. 7 shows an example help session workflow 700. Various sources of prior gameplay data 702 can be employed for designating help session triggering or ending conditions for a video game. The prior gameplay data can also be evaluated to evaluate video game helpers. For instance, the gameplay data can include gameplay sequences, communication logs, platform data, and instrumented game data, etc.

Gameplay sequences can include various sequences of video game outputs (video, audio, and/or haptic) and/or inputs obtained from one or more prior video gaming sessions. Optical character recognition can be performed on video frames in the gameplay sequences to obtain on-screen text features. In addition, machine learning can be performed on the video frames, audio output, and/or video game input to obtain ML-detected features. For instance, the ML-detected features can include object identifiers or embeddings obtained using computer vision model 204, described previously.

Communication logs can include chat or voice logs obtained during prior gaming sessions, e.g., communications between video game players when playing a particular video game. The communication logs can also include other types of communications, such as online forum discussions relating to a particular video game. The communication logs can be processed using natural language processing to obtain natural language processing features. For example, the natural language processing features can include sentiment relating to specific game scenarios.

Platform data can include data collected by a video gaming platform on which one or more video games can be executed. The platform data can include in-game achievements, saves, restarts, disengagement data, etc. The platform data can be processed using machine learning, rules, or statistical techniques to extract platform features.

Instrumented game data can include telemetry data collected by one or more video games. For example, games can track data such as levels completed, enemies defeated, etc. The instrumented game data can be processed using machine learning, rules, or statistical techniques to extract instrumented game data features.

The various features extracted from the prior gameplay data can be input to triggering condition designation processing 704. For instance, the triggering condition designation processing can involve applying one or more rules to the features to determine what conditions in a given video game will trigger a help session to begin and/or end. For instance, a rule could state that any condition that results in above a threshold percentage (e.g., 5%) of users disengaging after encountering that condition is designated as a help session triggering condition. In the examples above, the failure of a user to find a rare gem five times and then returning to the same location in the adventure game could be an example of a help session triggering condition. Similarly, a user crashing into the tree shown in FIG. 5A five times and then returning again to the same location on the track could be an example of a help session triggering condition.

In other cases, a machine learning model could be employed to designate help session triggering conditions. For instance, a generative language model or multi-modal generative could be provided with features reflecting user disengagement (e.g., from platform data). As another example, a generative model could be provided features reflecting negative in-game consequences or difficult in-game goals. The generative model could identify these conditions as appropriate conditions for triggering help sessions. In some cases, rules and or machine learning models can also be employed to designate help session ending conditions as well.

Once the help session triggering conditions have been designated, they can be used to populate a triggering condition database 706. The triggering condition database can include one or more help session triggering conditions (and possibly ending conditions) for one or more video games. Over time, the triggering condition database can evolve as circumstances change, such as updates to the video game(s).

In addition, the gameplay data can be processed by help session evaluation 708. In help session evaluation 708, the gameplay data for various help sessions is analyzed. A user database 710 is populated based on the analysis. For instance, the user database can include records for various video game helpers. The records can characterize how successful different video game helpers are on an overall basis, for specific video games, and/or at specific segments of video games, as described more below. The user database can also contain records relating to gaming sessions that do not involve game players receiving assistance.

Triggering condition database 706 and user database 710 can be populated in advance and/or on an ongoing basis as new gameplay data is received. When a current video game player is playing a particular video game, current session data 712 is received. For instance, the current session data can include output video or audio frames, controller inputs, etc. In other cases, the current session data can also include communications, platform data, or instrumented game data associated with the current gaming session. In addition, the user database 710 is accessed to identify whether the user has one or more save states from prior or current gaming sessions for the particular video game.

Help session implementation 714 can involve determining whether the current session data matches any of the triggering conditions in the triggering condition database 706. If so, then a help session can be initiated for the current video game player. The help session implementation can also involve determining when to end a help session, e.g., when a current video game player helper presses a specific button or buttons on their controller, or a help session ending condition is detected during gameplay. The help session implementation can also involve determining whether any helpers from helper database 710 are available and potentially selecting and/or ranking individual video game helpers, as discussed more below.

During the help session, help session data 716 is output. For instance, the help session data can include help session inputs that are provided to a helper session of the video game, and help session outputs that are provided to the helper session and the current user session. The help session can result in an updated help session state, e.g., resulting from gameplay by the helper. After the help session, help session results 718 are used to update the user database. For instance, the help session results can include a rating by the current video game player of the help session, an indication of any achievements or in-game goals that occurred during the help session, etc. The help session results can also include achievements for the current video game player.

Example System

Figure 8:
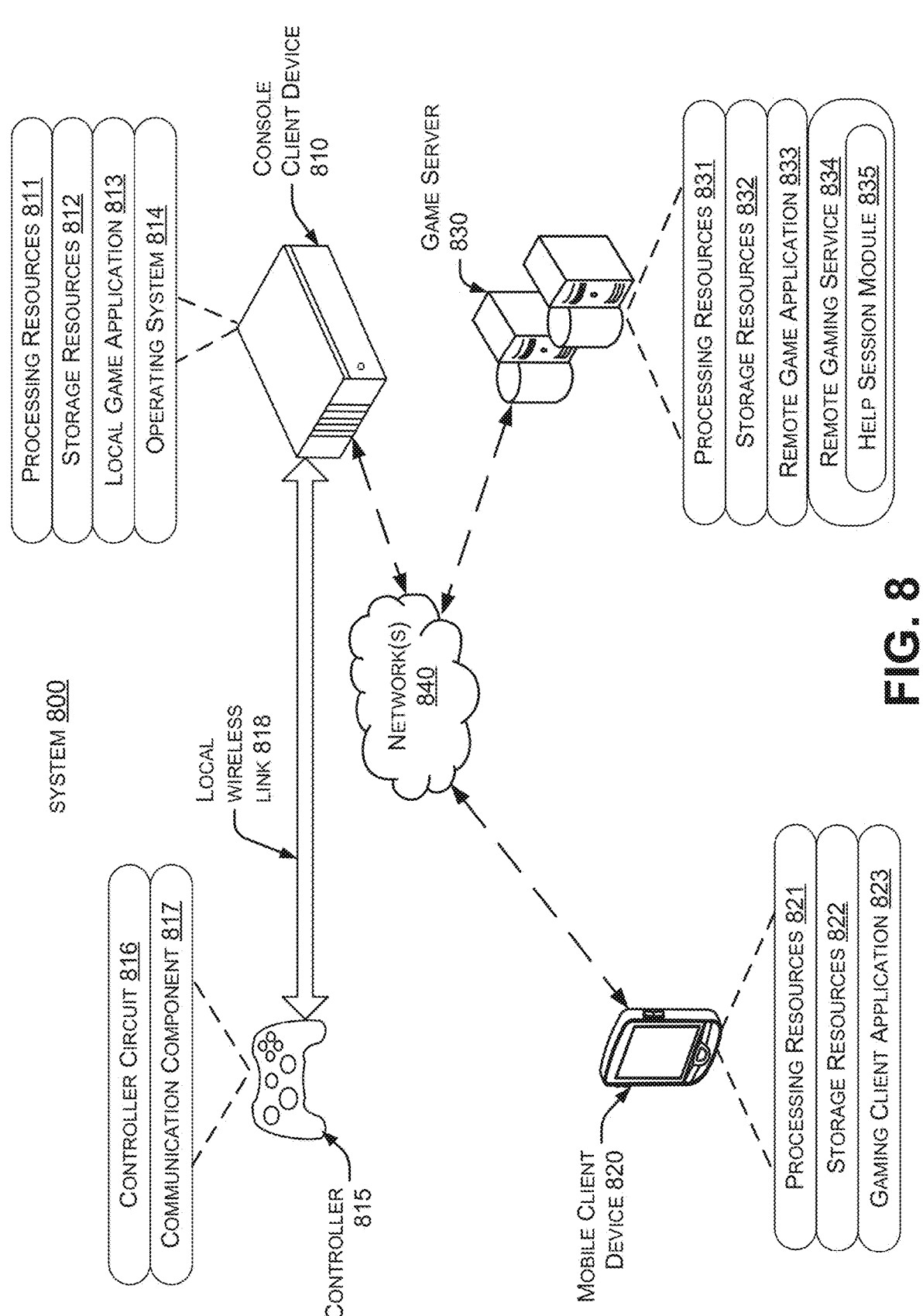
FIG. 8 illustrates an example system in which the present concepts can be employed.

The present concepts can be implemented in various technical environments and on various devices. FIG. 8 shows an example system 800 in which the present concepts can be employed, as discussed more below. As shown in FIG. 8, system 800 includes a console client device 810, a mobile client device 820, and a game server 830. Console client device 810, mobile client device 820, and server 830 are connected over one or more networks 840.

Console client device 810 can have processing resources 811 and storage resources 812, mobile client device 820 can have processing resources 821 and storage resources 822, and game server 830 can have processing resources 831 and storage resources 832. The devices of system 800 may also have various modules that function using the processing and storage resources to perform the techniques discussed herein, as discussed more below.

Console client device 810 can include a local game application 813 and an operating system 814. The local game application can execute using functionality provided by the operating system. The operating system can obtain control inputs from controller 815, which can include a controller circuit 816 and a communication component 817. The controller circuit can digitize inputs received by various controller mechanisms such as buttons or analog input mechanisms such as joysticks. The communication component can communicate the digitized inputs to the console client device over the local wireless link 818. The control interface module on the console can obtain the digitized inputs and provide them to the local application. The operating system can collect platform data during execution, and the game can collect instrumented game data during execution.

Mobile client device 820 can have a gaming client application 823. The gaming client application can send inputs from a touchscreen on the mobile client device and/or peripheral game controller to the server 830, and can also receive game outputs, such as video, chat, and/or audio streams, from the server(s) and output them via a display, loudspeaker, headset, etc.

Server 830 can include a remote game application 833, which can correspond to a streaming version of a video game. The server 830 can also have a remote gaming service 834, which can execute the remote game application and provide various support services, such as maintaining user accounts, tracking achievements, etc. The remote gaming service can also include a help session module 835 that implements help session workflow 700. For instance, the help session module can evaluate prior gameplay for games offered by the platform and then designate help session triggering/ending conditions as described above. The help session module can also perform any other part of workflow 700, such as updating achievement records to indicate whether an achievement was earned with assistance, modifying output of a video game to indicate a current video gamer is receiving assistance, directing inputs to a help session, etc.

In some cases, the operating system 814 on console client device 810 can detect the triggering conditions, e.g., by downloading the triggering conditions from remote gaming service 834 and evaluating current session data on the console. In other cases, the console periodically sends current session data to the remote gaming service, and the remote gaming service can determine when to initiate a help session. For games executed on game server 830, the triggering conditions can be detected by the remote gaming service 834 at runtime of individual games.

When a help session is initiated for a game executed on the console client device 810 or the mobile client device 820, the help session can be loaded as a separate process on any of the devices in system 800. For instance, the help session can be cloud-based help session implemented using a streaming instance of the video game, which can be instantiated and executed by the remote gaming service 834. Then, saved game state from that client device and/or stored by the remote gaming service can be used as a help session starting state. For instance, the helper can play a streaming version of the game using console client device 810 and/or mobile client device 820. When completed, the game state of the help session (the "updated help session state") can be provided to the current video game session on the game server 830 or the client device of the current video game player, and the current user can resume gameplay from that state.

Other implementations can involve executing a help session on a client device of the video game helper, where streaming output of the video game is provided to a client device of the video game player receiving help. In other cases, the current game session is a streaming cloud session and the help session can be implemented on a local client device of the video game. In other cases, both the current gaming session and the help session are streaming cloud instances of the video game. In some implementations, the operating system or a game platform application on a client device can include a help session module that performs functionality similar to that described above for help session module 835 on game server 830.

Example Method

Figure 9:
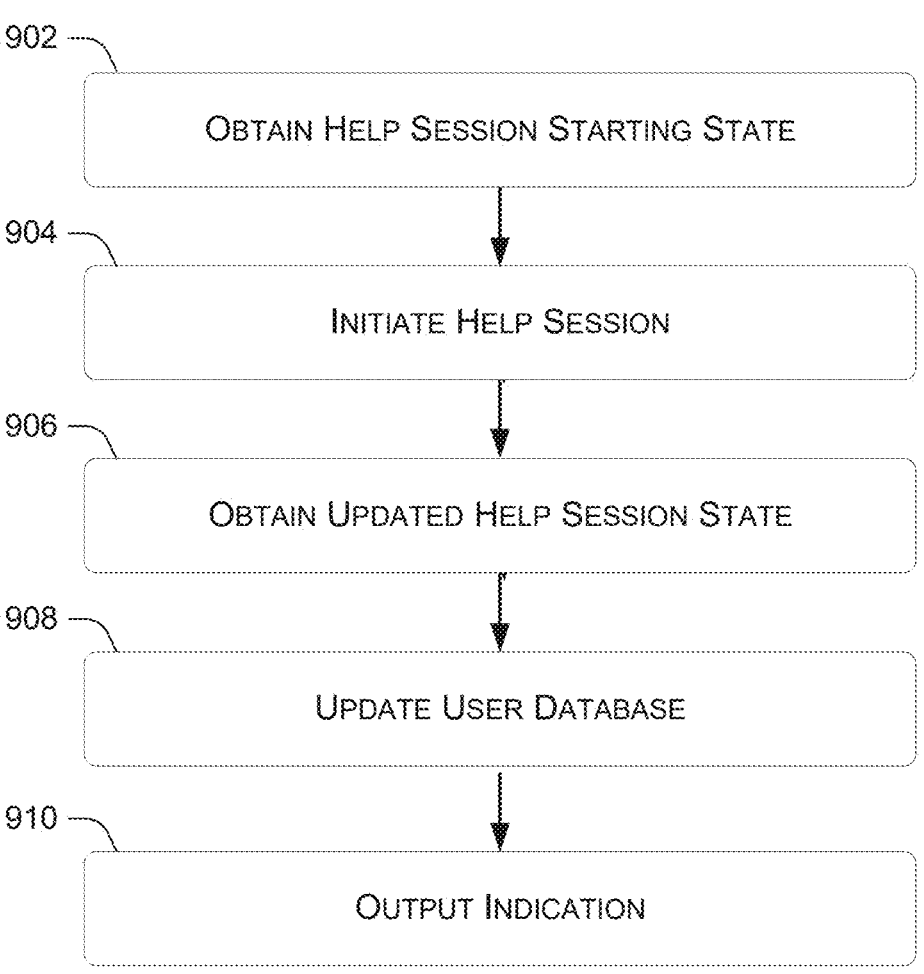
FIG. 9 illustrates a method for initiating a help session based on a detected help session triggering condition, consistent with some implementations of the present concepts.

FIG. 9 illustrates an example computer-implemented method 900 that can be used to initiate a help session for a video game for a current video gaming session, consistent with the present concepts. As discussed elsewhere herein, method 900 can be implemented on many different types of devices, e.g., by one or more cloud servers, by a client device such as a laptop, tablet, or smartphone, or by combinations of one or more servers, client devices, etc.

Method 900 continues at block 902, where a help session starting state is obtained. For instance, in some cases, the help session starting state is obtained by capturing a current state of the video game when the help session is about to start. In other cases, the help session starting state can be obtained by retrieving the help session starting state from a user database populated with save histories from local saves on a client device and/or cloud saves on a server.

Method 900 continues at block 904, where a help session is initiated from the help session starting state. For instance, the help session starting state can be loaded into a help session. For instance, the help session starting state can be loaded into memory on a computing device executing the help session, e.g., a server or a client device. In other cases, the help session starting state is sent over a network to another computing device that will execute the help session. During the help session, video game inputs can be received from a video game helper and directed to the help session. Once the help session ends, the video game has an updated help session state.

Method 900 continues at block 906, where the updated help session state is obtained. For instance, values in memory at the end of the help session can be stored in persistent storage. In other cases, the updated help session state can correspond to data instrumented to storage by the video game during the help session. The updated help session state can change the location, status, and/or inventory of a character relative to the help session starting state. The updated help session state can also include one or more achievements that occurred during the help session.

Method 900 continues at block 908, where a user database is updated. For instance, if the video game player receiving assistance accepts the updated help session state, then the user database can be updated with a new save state corresponding to the updated help session state. In addition, the user database can be updated to identify any achievements that were earned during the help session.

Method 900 continues at block 910, where an indication is output. For instance, a remote game service or operating system can display a home page for a user indicating that the achievement was earned with assistance. In other cases, the indication can be provided to other video game players, e.g., other users could access a profile of a particular player to see their achievements with any indications of achievements that were assisted by a helper.

Help Session Triggering and Ending Conditions

The following describes how various approaches can be employed to designate and/or detect help session triggering conditions in video games. Assume prior gameplay data 702 includes many video frames output by the racing game shown above. There may be many crashes at various courses along the track, along with many successful instances of game players successfully navigating the track. The fact that a video game player happens to crash at a given location does not necessarily mean that location would be useful as a triggering condition for help sessions, e.g., if the vast majority of video game players do not crash at that location.

However, assume that there are many instances of video output in prior gameplay data 702 that look very similar to the sequence shown in frame 502, frame 504, frame 506, and frame 508 of FIG. 5A, where the driver crashes into the tree. Further, assume the platform data indicates significant disengagement that is temporally correlated with those gameplay sequences. In other words, users are frequently driving the car into the tree shown in frame 508, then performing a restart of the driving game, switching to a different game, or stopping playing video games all together.

Further, assume that there are also a number of sequences of video output in prior gameplay data 702 that look very similar to frame 512, frame 514, frame 516, and frame 518 of FIG. 5B, where the driver successfully navigates the turn without crashing into the tree. Further, assume the platform data 76 indicates very little disengagement that is temporally correlated with those gameplay sequences. In other words, after driving past the tree as shown in frame 518, video game players are very rarely performing a restart of the driving game, switching to a different game, or stopping playing video games all together.

Using the example above, triggering condition designation processing 704 could designate a help session trigger condition occurring in the video driving game at frame 508. Since this frame shows a game circumstance that is strongly correlated with disengagement, it could be useful to offer help sessions to users when they appear to be struggling at this location on the road course. By looking at current session data 712, such as video output and input during a current gaming session, help session implementation 714 can detect the triggering condition and determine whether to offer the user a help session. For instance, the triggering condition could be detected by comparing one or more embeddings representing a current video frame to one or more embeddings representing frame 502. If the embeddings are sufficiently similar (e.g., within a threshold distance in a vector space) and the user has previously crashed into the tree a threshold number of times (e.g., five), then a help session can be triggered and then subsequently ended after the user successfully navigates past the tree. Note that it can be useful to initiate the help session somewhat before the negative in-game consequence tends to occur so that the helper has time to start playing the game and get acclimated to gameplay.

There are a wide range of techniques that can be employed for designating and detecting help session triggering conditions and help session ending conditions. The following illustrates just a few examples of how to do so.

First, consider a multi-modal generative model that has both computer vision and natural language capabilities. In some cases, numerous examples of video output of a video game could be sufficient for the multi-modal generative to identify that a help session is appropriate. For instance, a multi-modal generative could be trained with example sequences of video output and associated natural language data, such as user comments from a forum or chat log. The multi-modal generative could infer specific in-game conditions that tend to cause user comments to indicate disengagement, e.g., "I'm turning this off and going to bed," and then the multi-modal generative could correlate those comments with specific video frames. Then, current video frames could be input to the multi-modal generative and the multi-modal model could indicate whether a help session should be triggered based on the current video frames. As but a few examples, a multi-modal generative could learn from training examples that a health bar is low, a user has crashed into a tree or been defeated in a fight, is struggling to find an item or complete a level, etc.

One way to obtain such a model is to start with a pretrained multi-modal generative model and provide training data for multiple games associated with a given genre. Since adventure and fighting games tend to have health bars and battles with enemies, racing games tend to have timers and crashes, etc., it is possible for a multi-modal generative to be tuned to a specific game genre. For instance, a multi-modal generative model could have a transformer architecture that represents images and language tokens in a shared vector space, where images and tokens representing similar concepts are located close together in the vector space and images and tokens representing dissimilar concepts can be located far apart in the vector space. A similar approach can also be implemented by tuning separate computer vision and generative language models using training data for games from a given genre. For instance, a computer vision model could output classifications of objects detected in video frames, and those classifications could be provided to a separate generative language model that has been tuned to detect game difficulty, disengagement, and/or negative in-game consequences based on the classification identified by the computer vision model.

In some cases, a multi-modal generative model can be prompted to characterize a given in-game condition. For instance, a multi-modal generative could be prompted with a text description of a game provided by the game developer and one or more video frames, and the text description could allow the multi-modal generative model to more accurately understand what is being shown in video frames from that game. A similar technique could be performed by using a computer vision model to classify objects in a video frame and then input the names of those objects to a generative language model with the text description of the game.

In still further cases, a generative model can be employed to generate a natural language description of an in-game condition. For instance, the natural language could be "the user is approaching a stairway with a wall to their right." This text description can be correlated to in-game goals such as finding a rare gem, and then a help session triggering condition can be represented using the text description. In some cases, transcripts of video tutorials, forum discussions, and/or in-game chat or voice transcripts can also be input to a generative model to learn which in-game conditions tend to drive disengagement.

Generative models can also determine from prior gameplay data how common certain achievements are, how different audio or controller inputs sequences may correlate to user disengagement, etc. Generative models could also output descriptions of an in-game scenario, e.g., "the user is about to be defeated by a boss on top of a stone bridge" or "the user is having a hard time finding the rare gem on level 7." These descriptions could be used to trigger help sessions.

In some cases, generative models can also be employed to detect help session ending conditions. For instance, if a given segment of gameplay in prior gameplay data tends to end either with a crash into a tree or successfully navigating a turn, then successful navigation of the turn can be designated as an ending condition for help sessions. Likewise, if a given segment of gameplay tends to end with a user either moving too fast past a turn or slowing down for the turn and finding a rare gem, then finding the rare gem can be designated as an ending condition for help sessions. Models can also be tuned to select help session triggering conditions that occur early enough in gameplay so that the helper has time to react once gameplay begins.

In addition, some implementations can also determine the location of in-game elements such as gems, bosses, or places where frequent crashes occur. For instance, techniques such as photogrammetry or neural radiance fields can be employed to generate three-dimensional construction of a virtual scene provided by a video game. Help sessions can guide users to areas of the virtual scene where they may wish to achieve certain in-game goals.

In further cases, multi-modal generative models, vision models, and/or generative language models can be employed to designate help session triggering conditions and/or ending conditions, but other types of models are employed to detect those conditions during a current gaming session. For instance, a multi-modal generative model could identify a specific video frame as a help session triggering condition and another video frame as a help session ending condition, and embeddings of those video frames could be used to populate a triggering condition database. During gameplay, a smaller vision-only model could run periodically to generate embeddings of current video frames and compare them to the embeddings in the triggering condition database. A similar approach can be employed for audio or haptic output of a video game, and also for controller inputs to the video game. In other words, a help session triggering condition or ending condition could be represented using one or more of video embeddings, audio embeddings, haptic embeddings, and/or controller input sequences.

In further cases, a help session triggering condition can correspond to a video game player explicitly requesting help. For instance, a current video game player might enter text or voice stating, "I need help finding the rare gem near the staircase." A trained machine learning model could interpret the input to correspond to a specific game segment of the adventure game, and initiate a help session for that game segment.

Helper Selection

The following generally describes how helpers can be selected for a given help session when performing help session workflow 700. In some implementations, user database 710 can be populated with general information relating to a given helper. For instance, an overall average rating (e.g., number of stars) for each helper can be stored in the helper database. Then, this information can be employed to select a helper for a current session, e.g., by selecting a highly-rated helper at a time when a current video game session results in a help session triggering condition.

In other implementations, user database 710 can be populated using more game-specific information. For instance, each video game can have a separate rating for different games. Thus, LuckySeven might be highly-rated for the adventure game, but have a lower rating for other games such as the driving game. In this case, helpers can be selected on a game-specific basis, e.g., by selecting a highly-rated helper for a particular video game at a time when a current video game session involving that game results in a help session triggering condition.

In still further implementations, each help session triggering condition and/or help session ending condition can be associated with a specific help segment. Individual helpers can be evaluated based on their ratings for specific help segments. Thus, for instance, if LuckySeven has been relatively successful at helping adventure game players find the rare gem but has had more difficulty helping with other game segments (e.g., finding a sword later in the game), then LuckySeven may have a lower rating for those segments than for the segment that involves finding the rare gem. In this case, helpers can be selected on a segment-specific basis, e.g., by selecting a highly-rated helper for a particular video game segment at a time when a current video game session involving that game segment results in a help session triggering condition.

Helpers can also be selected based on other criteria, such as a percentage of other players that have accepted updated help session state for a given helper, or sentiment analysis of text or voice communication between helpers and video game players during or after help sessions. These criteria can be tracked over multiple video games, on a video game-specific basis, and/or on a segment-specific basis.

In further implementations, machine learning can be applied to video output associated with save states and/or to other save state data to choose a helper. For instance, a generative multi-modal model could process video output associated with a save state and output a message such as "This user needs help finding the rare gem near the staircase." In other cases, the current video game player themselves could provide similar input, e.g., "I need help finding the rare gem near the staircase." In either case, the natural language description could be used to select a helper that is highly rated for that segment. In other cases, the save state itself can be in a binary or computer language format (e.g., JavaScript Object Notation or JSON) and a machine learning model can be trained to extract help segment information directly from the save state to select a helper.

Further Implementations

Referring back to FIG. 6H, assisted achievement indication 642 is shown in a manner that visually distinguishes the achievement from other achievements earned without assistance. Many different approaches can be employed for doing so. For instance, one way to do so involves using text to convey that a given achievement was earned with assistance. In other cases, a graphical approach is employed, by modifying the color, transparency, size, etc. of an achievement indicator when the achievement was earned with assistance. As shown in FIG. 6I, the modification can be removed or cleared when the achievement is earned without assistance. Referring back to FIG. 6J, helper achievement indication 662, helper achievement indication 664, and helper achievement indication 666 can similarly be visually distinguished from other achievements that were earned by LuckySeven when playing their own video games instead of when assisting other video game players. In other cases, however, achievements earned with assistance are not distinguished from achievements earned independently. In still further implementations, helpers can earn the same achievement as the player that received the assistance, again with or without modification to convey that the achievement was earned during a help session.

In addition, note that scores for video game players can be computed based on whether a given achievement was earned individually, with assistance from a helper, and/or when assisting another user. For instance, a gamerscore could be discounted using some factor (e.g., a multiplier of 0.5) for any achievement earned with assistance. In other words, an achievement that, earned individually, would add 10 points to the gamerscore would add 5 points to the gamerscore if earned with assistance. As another example, helper achievements could be discounted in a similar manner, e.g., a 10-point achievement earned assisting another user could result in 5 points added to the helper's gamerscore, effectively distributing the points for the achievement to both players. In other cases, separate helper scores can be maintained, where the helper scores are tracked from achievements earned when assisting other users and displayed separately from gamerscores reflecting achievements earned individually.

As also shown above in FIGS. 6C through 6F, controllable entities such as characters or vehicles can be visually distinguished by adding text to indicate that the controllable entity is being controlled by a helper. Alternatively or in addition, controllable entities can be modified by changing the color, transparency, size, etc. to indicate that the controllable entity is being controlled by a helper. In some implementations, designated control input sequences can be employed by a video game player and helper to hand control of a controllable entity back and forth during a help session, and the appearance of the controllable entity can be modified as described above to convey which player is controlling that entity at any given time.

In some cases, the techniques described herein can be performed at the platform level, e.g., by an operating system or remote game service. Thus, in these implementations, the video game renders video output without necessarily even "knowing" that the help session is occurring. In this case, the platform can add text overlays to video frames output by the video game to indicate that the controllable entity is being controlled by a helper. In other cases, an image segmentation model such as Mask-RCNN (He, et al, "*Mask R-CNN*," in Proceedings of the IEEE International Conference on Computer Vision, 2017, pp. 2961-2969) can be employed to obtain a segmentation of the controllable entity from the video frames output by the video game. The video output within that segmentation can be modified to change the appearance of the controllable entity, e.g., via inpainting using a model such as Stable Diffusion (Rombach, et al., "High-Resolution Image Synthesis with Latent Diffusion Models," Proceedings of the IEEE/CVF Conference on Computer Vision and Pattern Recognition, 2022).

In still further implementations, a gaming platform can coordinate appointments between a video game player and a helper. For instance, if a determination is made that assistance is appropriate for a given video game player with a particular segment of that video game, then a helper can be selected for that segment. Then, the platform can evaluate calendars of the video game player and helper to identify a suitable time for a help appointment. If both players accept the appointment, they can be notified via a graphical user interface element with an option that initiates the help session, e.g., as shown in FIG. 6A.

In some cases, the platform can also send communications to a selected helper to request that they join a help session. For instance, the communication can be an email or a text message sent to the helper. The communication can convey the help session starting state, e.g., so that the helper can see where they will be starting the help session. For instance, if a helper receives a notification on their phone, the notification might instruct the helper to connect a wireless controller to their phone to conduct the help session, potentially offering an incentive (e.g., a specified number of achievement points) to do so.

Technical Effect

As noted above, the disclosed implementations can be employed to automatically designate and detect help session triggering conditions. As a result, human-computer interaction can be improved by having a computer initiate a help session for a user. For instance, users may not be able to accurately determine when a help session is appropriate to initiate or to terminate. Using the disclosed techniques, specific in-game circumstances can be accurately detected and help sessions can be offered in a manner that encompasses scenarios where help is appropriate, based on prior interactions by other users with a given video game.

In addition, the disclosed techniques also provide for automated techniques to improve human-computer interaction by conveying who is controlling a particular controllable entity and/or how achievements were earned. This allows users to interact with video games and understand each other's achievements and current game situation without cumbersome alternative input steps, such as using chat or voice sessions to indicate when they are being helped and/or did not earn an achievement by themselves.

Device Implementations

As noted above with respect to FIG. 8, system 800 includes several devices, including a console client device 810, a mobile client device 820, and a game server 830. As also noted, not all device implementations can be illustrated, and other device implementations should be apparent to the skilled artisan from the description above and below.

The term "device," "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 840. Without limitation, network(s) 840 can include one or more local area networks (LANs), wide area networks (WANs), the Internet, and the like.

Various examples are described above. Additional examples are described below. One example includes computer-implemented method comprising obtaining a help session starting state from a saved state of game play of a particular video game by a particular video game player, initiating a help session for the particular video game player from the help session starting state, the help session involving a video game helper assisting the particular video game player with the particular video game, obtaining an updated help session state of the particular video game after the help session, in an instance when the particular video game player accepts the updated help session state and the updated help session state includes an achievement that occurred during the help session, updating a user database with a record indicating that the achievement occurred during the help session, and outputting an indication that the particular video game player earned the achievement with assistance.

Another example can include any of the above and/or below examples where the indication is a graphical representation of the achievement that is modified to indicate that the achievement was earned with assistance.

Another example can include any of the above and/or below examples where the indication comprises a textual indication that the achievement was earned with assistance.

Another example can include any of the above and/or below examples where the method further comprises detecting that the particular video game player has earned the achievement in a subsequent gaming session without assistance, and responsive to determining that the particular video game player has earned the achievement without assistance, replacing the indication with another indication that the particular video game player earned the achievement without assistance.

Another example can include any of the above and/or below examples where the method further comprises granting the video game helper a helper achievement based on the achievement occurring during the help session.

Another example can include any of the above and/or below examples where the method further comprises granting the helper achievement responsive to determining that the particular video game player accepts the updated help session state.

Another example can include any of the above and/or below examples where the method further comprises determining a helper score for the video game helper based on the helper achievement and one or more other helper achievements that the video game helper has earned during other help sessions, and outputting the helper score in association with an identity of the video game helper.

Another example can include a system comprising processing resources, and storage resources storing computer-readable instructions which, when executed by the processing resources, cause the processing resources to obtain a help session starting state from a saved state of game play of a particular video game by a particular video game player, initiate a help session for the particular video game player from the help session starting state, the help session involving a video game helper assisting the particular video game player with the particular video game, obtain an updated help session state of the particular video game after the help session, in an instance when the particular video game player accepts the updated help session state and the updated help session state includes an achievement that occurred during the help session, update a user database with a record indicating that the achievement occurred during the help session, and output an indication that the particular video game player earned the achievement with assistance.

Another example can include any of the above and/or below examples where the computer-readable instructions, when executed by the processing resources, cause the processing resources to during the help session, modify output of the particular video game to indicate that the particular video game player is receiving assistance.

Another example can include any of the above and/or below examples where the output is modified by modifying an appearance of a controllable entity representing the particular video game player.

Another example can include any of the above and/or below examples where the modifying comprises using an image segmentation model, obtaining a segmentation of the controllable entity from video output of the particular video game during the help session, and modifying the video output within the segmentation to indicate that the controllable entity is being controlled by the video game helper.

Another example can include any of the above and/or below examples where the computer-readable instructions, when executed by the processing resources, cause the processing resources to transfer control back and forth between the particular video game player and the video game helper during the help session based on received sequences of control inputs that are designated for passing control, and as control is transferred, modify the appearance of the controllable entity to indicate whether the particular video game player or the video game helper has control of the controllable entity.

Another example can include any of the above and/or below examples where the output is modified by adding text indicating the particular video game player is receiving assistance.

Another example can include any of the above and/or below examples where the computer-readable instructions, when executed by the processing resources, cause the processing resources to coordinate an appointment for the help session between the particular video game player and the video game helper.

Another example can include any of the above and/or below examples where the computer-readable instructions, when executed by the processing resources, cause the processing resources to coordinate the appointment for the help session by evaluating calendars of the particular video game player and the helper to determine a designated time for the help session.

Another example can include any of the above and/or below examples where the computer-readable instructions, when executed by the processing resources, cause the processing resources to detect that the particular video game player needs assistance with a particular segment of the game, and select the video game helper based on the particular segment.

Another example can include any of the above and/or below examples where the computer-readable instructions, when executed by the processing resources, cause the processing resources to send a communication to the video game helper requesting that they join the help session.

Another example can include any of the above and/or below examples where the communication comprising an email or a text message.

Another example can include any of the above and/or below examples where the communication conveying the help session starting state.

Another example can include a computer-readable storage medium storing computer-readable instructions which, when executed by a hardware processing unit, cause the hardware processing unit to perform acts comprising obtaining a help session starting state from a saved state of game play of a particular video game by a particular video game player, initiating a help session for the particular video game player from the help session starting state, the help session involving a video game helper assisting the particular video game player with the particular video game, obtaining an updated help session state of the particular video game after the help session, in an instance when the particular video game player accepts the updated help session state and the updated help session state includes an achievement that occurred during the help session, updating a user database with a record indicating that the achievement occurred during the help session, and outputting an indication that the particular video game player earned the achievement with assistance.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A computer-implemented method comprising:
obtaining a help session starting state from a saved state of game play of a particular video game by a particular video game player;
initiating a help session for the particular video game player from the help session starting state, the help session involving a video game helper assisting the particular video game player with the particular video game;

obtaining an updated help session state of the particular video game after the help session;

in an instance when the particular video game player accepts the updated help session state and the updated help session state includes an achievement that occurred during the help session, updating a user database with a record indicating that the achievement occurred during the help session; and outputting an indication that the particular video game player earned the achievement with assistance.

2. The computer-implemented method of claim 1, wherein the indication is a graphical representation of the achievement that is modified to indicate that the achievement was earned with assistance.

3. The computer-implemented method of claim 1, wherein the indication comprises a textual indication that the achievement was earned with assistance.

4. The computer-implemented method of claim 1, further comprising:

detecting that the particular video game player has earned the achievement in a subsequent gaming session without assistance; and responsive to determining that the particular video game player has earned the achievement without assistance, replacing the indication with another indication that the particular video game player earned the achievement without assistance.

5. The computer-implemented method of claim 1, further comprising:

granting the video game helper a helper achievement based on the achievement occurring during the help session.

6. The computer-implemented method of claim 5, further comprising:

granting the helper achievement responsive to determining that the particular video game player accepts the updated help session state.

7. The computer-implemented method of claim 5, further comprising:

determining a helper score for the video game helper based on the helper achievement and one or more other helper achievements that the video game helper has earned during other help sessions; and outputting the helper score in association with an identity of the video game helper.

8. A system comprising:

processing resources; and storage resources storing computer-readable instructions which, when executed by the processing resources, cause the processing resources to:

obtain a help session starting state from a saved state of game play of a particular video game by a particular video game player;

initiate a help session for the particular video game player from the help session starting state, the help session involving a video game helper assisting the particular video game player with the particular video game;

obtain an updated help session state of the particular video game after the help session;

in an instance when the particular video game player accepts the updated help session state and the updated help session state includes an achievement that occurred during the help session, update a user database with a record indicating that the achievement occurred during the help session; and output an indication that the particular video game player earned the achievement with assistance.

9. The system of claim 8, wherein the computer-readable instructions, when executed by the processing resources, cause the processing resources to:

during the help session, modify output of the particular video game to indicate that the particular video game player is receiving assistance.

10. The system of claim 8, wherein the output is modified by modifying an appearance of a controllable entity representing the particular video game player.

11. The system of claim 10, wherein the modifying comprises:

using an image segmentation model, obtaining a segmentation of the controllable entity from video output of the particular video game during the help session; and modifying the video output within the segmentation to indicate that the controllable entity is being controlled by the video game helper.

12. The system of claim 11, wherein the computer-readable instructions, when executed by the processing resources, cause the processing resources to:

transfer control back and forth between the particular video game player and the video game helper during the help session based on received sequences of control inputs that are designated for passing control; and as control is transferred, modify the appearance of the controllable entity to indicate whether the particular video game player or the video game helper has control of the controllable entity.

13. The system of claim 9, wherein the output is modified by adding text indicating the particular video game player is receiving assistance.

14. The system of claim 8, wherein the computer-readable instructions, when executed by the processing resources, cause the processing resources to:

coordinate an appointment for the help session between the particular video game player and the video game helper.

15. The system of claim 14, wherein the computer-readable instructions, when executed by the processing resources, cause the processing resources to:

coordinate the appointment for the help session by evaluating calendars of the particular video game player and the helper to determine a designated time for the help session.

16. The system of claim 8, wherein the computer-readable instructions, when executed by the processing resources, cause the processing resources to:

detect that the particular video game player needs assistance with a particular segment of the game; and select the video game helper based on the particular segment.

17. The system of claim 8, wherein the computer-readable instructions, when executed by the processing resources, cause the processing resources to:

send a communication to the video game helper requesting that they join the help session.

18. The system of claim 17, the communication comprising an email or a text message.

19. The system of claim 17, the communication conveying the help session starting state.

20. A computer-readable storage medium storing computer-readable instructions which, when executed by a hardware processing unit, cause the hardware processing unit to perform acts comprising:

obtaining a help session starting state from a saved state of game play of a particular video game by a particular video game player;

initiating a help session for the particular video game player from the help session starting state, the help session involving a video game helper assisting the particular video game player with the particular video game;

obtaining an updated help session state of the particular video game after the help session;

in an instance when the particular video game player accepts the updated help session state and the updated help session state includes an achievement that occurred during the help session, updating a user database with a record indicating that the achievement occurred during the help session; and outputting an indication that the particular video game player earned the achievement with assistance.

\*  \*  \*  \*  \*